US008902514B2

(12) United States Patent
Nishiwaki et al.

(10) Patent No.: US 8,902,514 B2
(45) Date of Patent: Dec. 2, 2014

(54) DIFFRACTIVE LENS

(75) Inventors: Seiji Nishiwaki, Hyogo (JP); Takamasa Ando, Osaka (JP); Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 13/378,386

(22) PCT Filed: Apr. 28, 2011

(86) PCT No.: PCT/JP2011/002508
§ 371 (c)(1),
(2), (4) Date: Dec. 15, 2011

(87) PCT Pub. No.: WO2011/142101
PCT Pub. Date: Nov. 17, 2011

(65) Prior Publication Data
US 2012/0092769 A1    Apr. 19, 2012

(30) Foreign Application Priority Data

May 10, 2010  (JP) .................................. 2010-108507

(51) Int. Cl.
*G02B 3/08*    (2006.01)
*G02B 5/18*    (2006.01)

(52) U.S. Cl.
CPC .................................. *G02B 5/1876* (2013.01)
USPC .......................................... 359/742; 359/569

(58) Field of Classification Search
CPC ................................ G02B 3/08; G02B 5/1876
USPC .................................... 359/558–576, 742–743
See application file for complete search history.

(56) References Cited

U.S. PATENT DOCUMENTS 3,004,470 A * 10/1961 Ruhle ........................... 359/721
6,429,972 B1   8/2002 Ota et al.
6,654,184 B1  11/2003 Maruyama
(Continued)

FOREIGN PATENT DOCUMENTS

JP    2000-171704 A    6/2000
JP    2000-249818 A    9/2000
(Continued)

OTHER PUBLICATIONS

International Search Report for corresponding International Application No. PCT/JP2011/002508 mailed Jun. 28, 2011.

*Primary Examiner* — Stephone B Allen
*Assistant Examiner* — Kimberly N Kakalec
(74) *Attorney, Agent, or Firm* — Renner, Otto, Boisselle & Sklar, LLP

(57) ABSTRACT

A diffractive lens according to the present invention has the function of focusing light. The diffractive lens has a side on which a diffraction grating is arranged on either an aspheric surface or a spherical surface in its effective area. The diffraction grating has $n_0$ phase steps, which are arranged concentrically around the optical axis of the diffractive lens. And the radius $r_n$ of the circle formed by an $n^{th}$ one (where n is an integer that falls within the range of 0 through $n_0$) of the phase steps as counted from the optical axis of the diffractive lens satisfies $$r_n = \sqrt{a\{(n+c+d_n)-b(n+c+d_n)^m\}}$$

where a, b, c and m are constants that satisfy $a>0$, $0 \leq c < 1$, $m>1$, and $$0.05 b_0 < b < b_0$$

$$b_0 = \frac{1}{m n_0^{m-1}}$$

and $d_n$ is an arbitrary value that satisfies $-0.25 < d_n < 0.25$.

3 Claims, 18 Drawing Sheets

(56) References Cited

U.S. PATENT DOCUMENTS

2005/0093992 A1    5/2005   Fukumoto
2006/0055883 A1*   3/2006   Morris et al. ................ 351/168
2009/0225215 A1*   9/2009   Korenaga et al. ............ 348/340

FOREIGN PATENT DOCUMENTS

| JP | 2000-333076 A | 11/2000 |
| JP | 2005-167485 A | 6/2005 |
| JP | 2001-305323 A | 10/2011 |

* cited by examiner (a)

(b)

(c)

(a) ASPHERIC BASIC SHAPE (b) PHASE FUNCTION (c) DIFFRACTION GRATING SURFACE SHAPE
(= ASPHERIC BASIC SHAPE + PHASE FUNCTION)

(a)

(b)

DIFFRACTIVE LENS

TECHNICAL FIELD

The present invention relates to a diffractive lens for focusing light through diffraction and also relates to an image capture device that uses such a diffractive lens.

BACKGROUND ART

There are various kinds of optical elements that have a function of focusing light. Some of those optical elements use refraction, others use diffraction, and still others may use both of these two functions in combination. In this description, an optical element as a combination of an optical element that uses refraction and an optical element that uses diffraction will be referred to herein as a "diffractive lens". A diffractive lens is obtained by forming a diffraction grating on the refracting surface of a lens and contributes to increasing the number of design parameters for adjusting optical properties. Consequently, with a diffractive lens, the number of lenses required can be reduced with the same optical performance maintained.

It is also well known that a diffractive lens contributes effectively to reducing various kinds of aberrations of a lens including field curvature and chromatic aberration (which is a shift of a focal point with the wavelength). This is partly because a diffraction grating has the opposite type of dispersion property to the one caused by an optical material. Such a dispersion property is sometimes called a "reverse dispersion property".

The shape of a diffractive lens is a combination of the base shape of a lens body, on which a diffraction grating is to be formed (i.e., the shape of a refractive lens), and the shape of the diffraction grating. For example, FIG. 13(a) illustrates an aspheric shape Sb of a lens body and FIG. 13(b) illustrates a diffraction grating shape Sp1, which is determined by the phase function represented by the following Equations (1):

$$\phi(r) = \frac{2\pi}{\lambda_0}\left\{\psi(r) - \lambda_0 \text{int}\left(\frac{\psi(r)}{\lambda_0}\right)\right\} \quad (1)$$

$$\psi(r) = a_1 r + a_2 r^2 + a_3 r^3 + a_4 r^4 + a_5 r^5 + a_6 r^6 + \ldots + a_i r^i$$

$$(r^2 = x^2 + y^2)$$

where $\phi(r)$ is a phase function represented by the curve Sp in FIG. 13(b), $\Psi(r)$ is an optical path length difference function ($z=\Psi(r)$), int is an integer operator, r is a radial distance from the optical axis, $\lambda_0$ is a designed wavelength, and $a_1, a_2, a_3, a_4, a_5, a_6, \ldots$ and $a_i$ are phase coefficients. As can be seen from FIG. 13(b), in the shape Sp1, a phase step is produced every time the phase goes over $2\pi$.

According to a conventional method for designing the shape of a diffractive lens, supposing there is a diffraction grating on an aspheric shape Sb, an aspheric coefficient that determines an aspheric shape Sb and a phase function that determines a phase function sp are obtained at the same time so that the optical property to be achieved by giving an optical path length difference based on the phase function Sp to the aspheric shape Sb has a desired level. The shape Sbp1 of the diffraction grating surface is determined by adding the shape Sp1 corresponding to the phase difference function to the aspheric shape Sb (see FIG. 13(c)). The height d of the phase step shown in FIG. 13(c) generally satisfies the following Equation (2):

$$d = \frac{q \cdot \lambda}{n_1(\lambda) - 1} \quad (2)$$

where q is a designed order (e.g., q=1 as for first-order diffracted light), $\lambda$ is the operating wavelength, d is the step height of the diffraction grating, and $n_1(\lambda)$ is the refractive index of a lens material that makes the lens body at the operating wavelength $\lambda$. The refractive index of a lens material has a wavelength dependence and is a function of the wavelength. In a diffraction grating that satisfies this Equation (2), the phase difference between the root and the end of a phase step becomes $2\pi$ on the phase function, and the optical path difference with respect to light with the operating wavelength $\lambda$ becomes an integral number of times as long as the wavelength. Consequently, the diffraction efficiency of $q^{th}$-order diffracted light (which will be referred to herein as "$q^{th}$-order diffraction efficiency") with respect to light with the operating wavelength can be approximately equal to 100%.

It is known that in such a diffractive lens, as the error from the relation represented by Equation (2) widens, diffracted light rays of non-designed orders are produced one after another, thus causing flares or ghosts that covers the image field and deteriorating the image quality.

Thus, in order to eliminate such flares to be caused by diffracted light rays of non-designed orders from an image processor that uses such a diffractive lens, Patent Document No. 1 discloses a method for reducing the influence of the flares by detecting the locations of pixels with saturated luminance, estimating the locations and intensities of the flares with respect to those pixel locations, and performing signal processing on the image based on those data.

On the other hand, Patent Document No. 2 discloses a method for reducing the influence of flares on a digital camera that uses a diffractive lens. According to the method of Patent Document No. 2, if there are any saturated pixels when the first frame is shot, the second frame is shot so as to prevent those pixels from getting saturated again and then the image shots of the first and second frames are subjected to computational processing to eliminate flares.

CITATION LIST

Patent Literature

Patent Document No. 1: Japanese Patent Application Laid-Open Publication No. 2005-167485
Patent Document No. 2: Japanese Patent Application Laid-Open Publication No. 2000-333076

SUMMARY OF INVENTION

Technical Problem

According to the methods disclosed in Patent Documents Nos. 1 and 2, however, the influence of the flares can be certainly reduced by performing computational processing on the images shot, but the flares themselves cannot be eliminated. That is why it cannot be said those methods are ultimate countermeasures. For example, it is difficult for the image processor disclosed in Patent Document No. 1 to estimate the locations and intensities of the flares. And if the estimation is inaccurate, the flares to appear on the resultant image could rather be even more noticeable. On the other hand, with the digital camera disclosed in Patent Document No. 2, images need to be shot twice, and the sensitivity should be controlled for the second time around so as to prevent the pixels from getting saturated. Thus, according to such a method, easiness of the image shooting session should be sacrificed.

The present inventors also discovered that as the concentric ring zone pitch on the diffraction grating surface of a diffractive lens was decreased when a subject with a very high light intensity was being shot, flares would be produced by diffracted light rays that had been generated by being cut off at the phase step portions, not the diffracted light rays of the non-designed orders described above. Such flares will be referred to herein as "diffraction induced flares". It is not known that such diffraction induced flares are generated in a diffractive lens. The present inventors also discovered that under a particular condition, the diffraction induced flares were one of the factors that would deteriorate the quality of an image shot.

It is therefore an object of the present invention to provide a diffractive lens that can minimize the diffraction induced flares (i.e., flares induced by diffracted light rays that have been generated by being cut off at the phase step portions) and flares caused by diffracted light rays of non-designed orders and also provide an image capture device that uses such a diffractive lens.

Solution to Problem

A diffractive lens according to the present invention has the function of focusing light. The diffractive lens has a side on which a diffraction grating is arranged on either an aspheric surface or a spherical surface in its effective area. The diffraction grating has $n_0$ phase steps, which are arranged concentrically around the optical axis of the diffractive lens. And the radius $r_n$ of the circle formed by an $n^{th}$ one (where n is an integer that falls within the range of 0 through $n_0$) of the phase steps as counted from a side of the optical axis of the diffractive lens satisfies $$r_n = \sqrt[r]{a\{(n+c+d_n) - b(n+c+d_n)^m\}}$$

where a, b, c and m are constants that satisfy $a>0$, $0 \leq c<1$, $m>1$, and $$0.05 b_0 < b < b_0$$

$$b_0 = \frac{1}{m n_0^{m-1}}$$

and $d_n$ is an arbitrary value that satisfies $-0.25 < d_n < 0.25$.

Another diffractive lens according to the present invention has the function of focusing light. The diffractive lens has a side on which a diffraction grating is arranged on either an aspheric surface or a spherical surface in its effective area. The diffraction grating has a number of concentric ring zones, which are arranged around the optical axis of the diffractive lens, and a number of concentric phase steps, each of which is located between its associated pair of the concentric ring zones. A distance between a focal point of light that is transmitted and diffracted through a surface that defines an $n^{th}$ one of the ring zones as counted from a side of the optical axis and another focal point of light, which has been obtained on the supposition that light passing through a shadow region that is associated with the $n^{th}$ one of the phase steps as counted from the side of the optical axis should be diffracted is either constant with respect to n or increases with n.

In one preferred embodiment, the diffractive lens further includes an optical adjustment film that covers the diffraction grating.

An image capture device according to the present invention includes a diffractive lens according to any of the preferred embodiments of the present invention described above, and an image sensor.

Advantageous Effects of Invention

In a diffractive lens according to the present invention, phase steps are arranged at predetermined positions, and therefore, the diffraction induced flares just diffuse without interfering with each other to reach a plane that includes the focal point of the diffractive lens and that intersects with the optical axis at right angles. Consequently, the intensity of the flares produced by the diffraction grating can be reduced.

DESCRIPTION OF EMBODIMENTS

Figure 14:
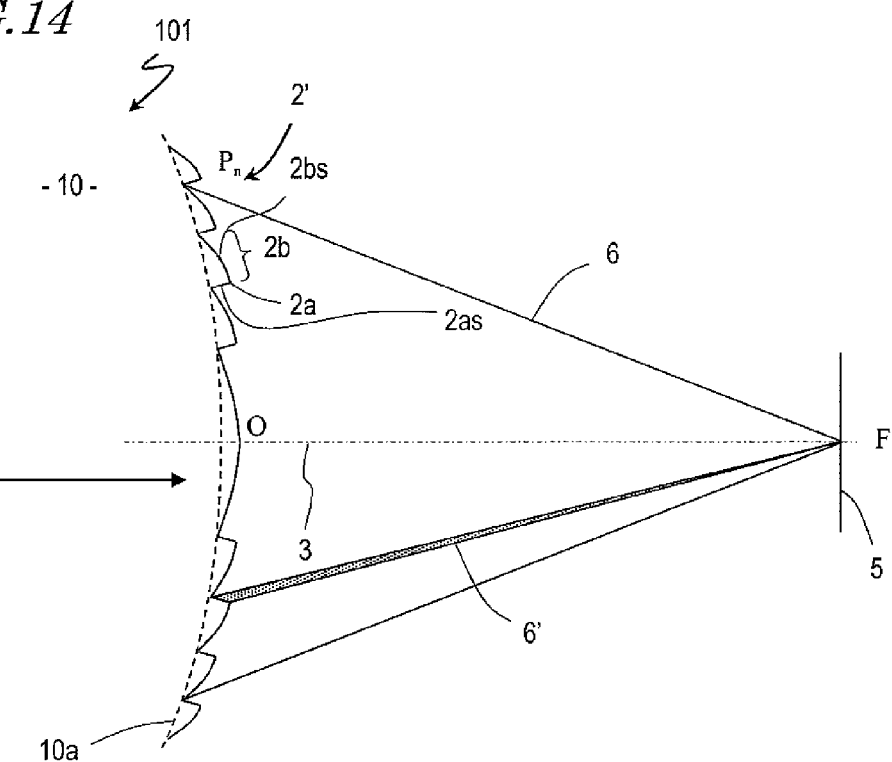
FIG. 14 illustrates how a conventional diffractive lens focuses light that has been incident parallel to the optical axis.

First of all, the diffraction induced flares, which were discovered by the present inventors, will be described. FIG. 14 schematically illustrates a cross section of a conventional diffractive lens 101. The diffractive lens 101 includes a lens body 10 and a diffraction grating 2', which has been formed on the surface 10a of the lens body 10. The diffraction grating 2' is defined by a number of phase steps 2a, which are arranged concentrically around the optical axis 3 of the diffraction lens 101, and a number of ring zones 2b, each of which is interposed between associated pair of the phase steps 2a.

Figure 13:
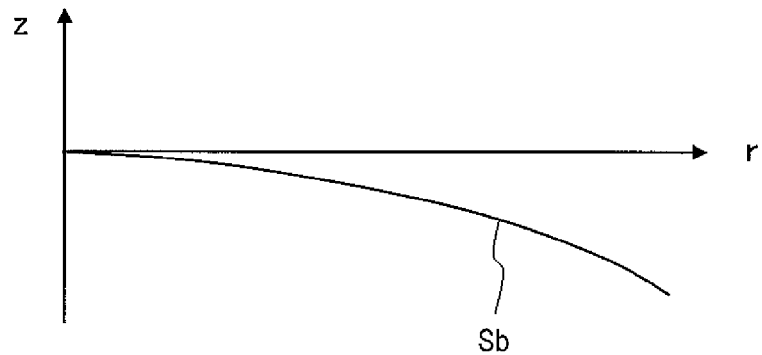
FIGS. 13(a) through 13(c) illustrate how to determine the diffraction grating surface shape of a conventional diffractive lens, wherein (a) illustrates a basic shape, (b) shows a phase difference function, and (c) illustrates the surface shape of a diffraction grating.
Figure 13:
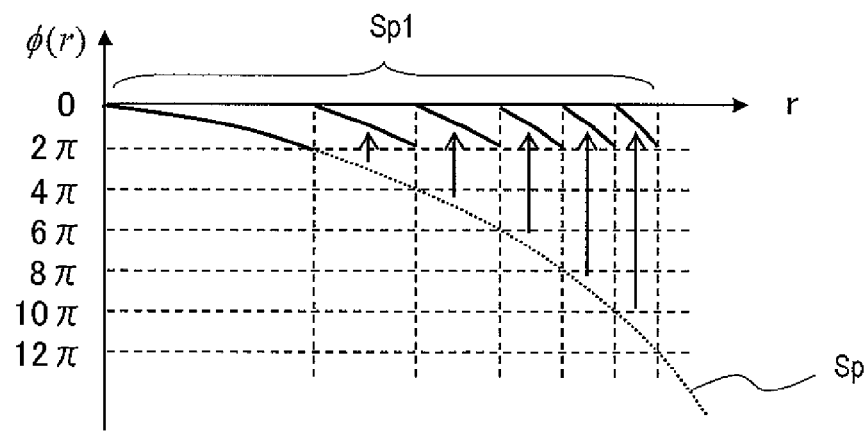
Figure 13:
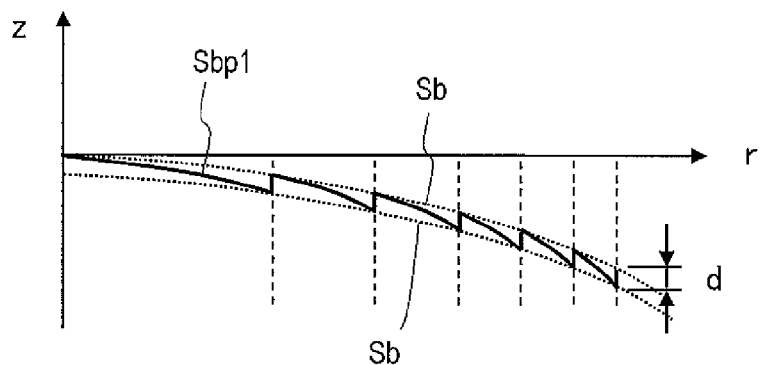

As already described with reference to FIG. 13, each of those rings zones 2b has a surface shape that is a combination of the base shape of the lens body 10 and the phase function. That is why the outgoing light that passes through the surface 2bs of the ring zone 2b is subjected to non only refraction effect produced by the lens system refracting surface, including the surface 10a of the lens body 10, but also diffraction effect produced by the diffraction grating 2. As a result, the incoming light 4 can be transformed into a light ray 6 to be focused onto a point F on the image capturing plane 5 of an image sensor.

On the other hand, the outgoing light that passes through the surface 2as of each phase step 2a has a wavefront that is discontinuous with that of the light that has been transmitted through its associated ring zone 2b, and therefore, goes everywhere as stray light and does not substantially contribute to focusing the light onto the focal point F. That is why in the range 6' that surrounds the surface 2as of a phase step 2a and the focal point F, there is substantially no light that leaves the surface 2as and eventually reaches the point F. That is to say, in that range 6', there is no light contributing to focusing in the bundle of rays being converged toward the focal point F. In this sense, this range 6' may be called a "shadow region" and will be referred to herein as such.

Figure 15:
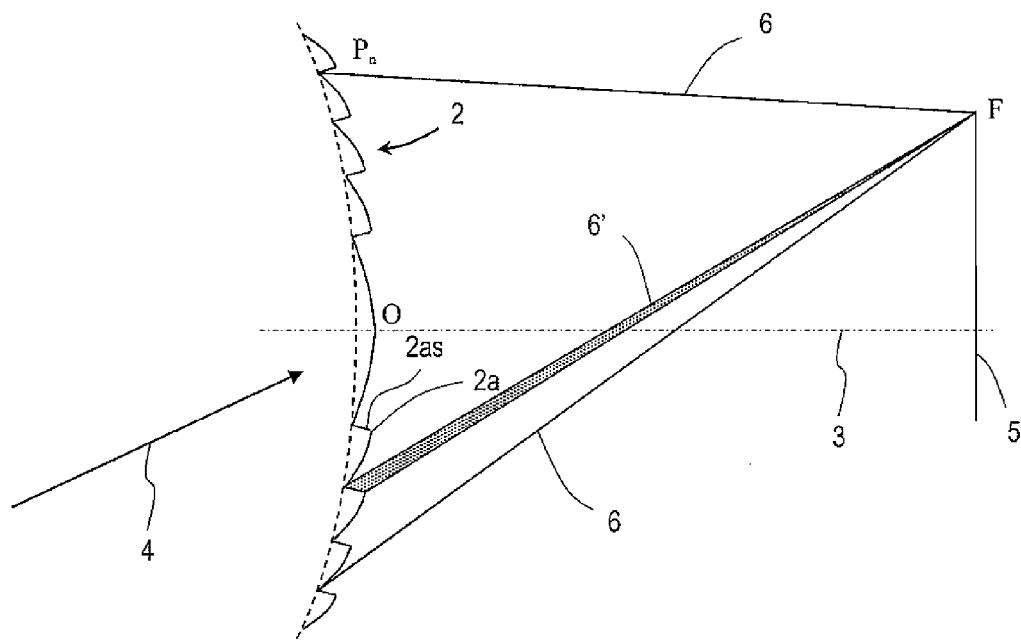
FIG. 15 illustrates how a conventional diffractive lens focuses light that has been incident obliquely to the optical axis.

There are as many shadow regions 6' as the phase steps 2a with respect to the light being converged toward the focal point F. However, if the surface 2as of each phase step 2a is parallel to the optical axis 3, the area of each shadow region 6' can be reduced. FIG. 15 illustrates how this diffractive lens focuses an incoming light ray 4 that has been incident obliquely with respect to the optical axis of the diffractive lens. Since the incoming light ray 4 is tilted with respect to the optical axis 3, its focal point F on the image capturing plane 5 is off the optical axis 3 and the width of each shadow region 6' increases significantly in that case.

Figure 16:
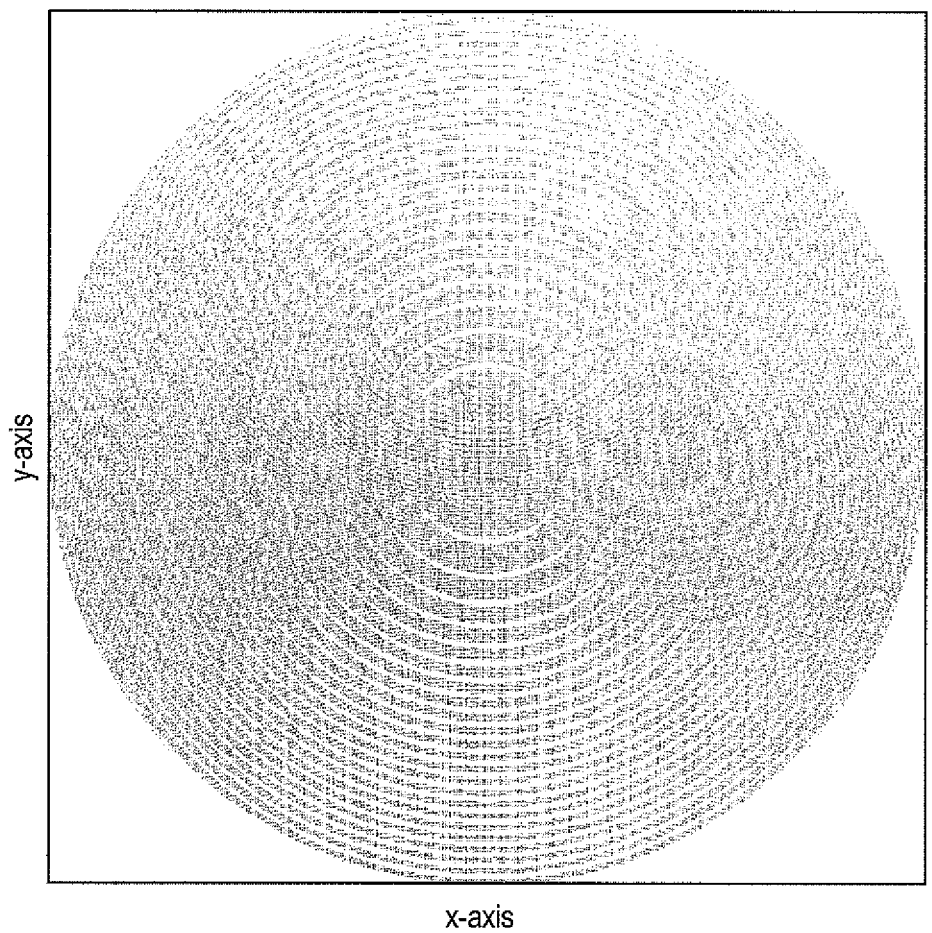
FIG. 16 is a spot diagram illustrating light rays that have just been transmitted through a conventional diffractive lens.

FIG. 16 is a spot diagram illustrating light rays that have just been transmitted through the diffraction grating in a set of two diffractive lenses, which were actually used in a design example, in a situation where the light was incident with an angle of incidence of 60 degrees with respect to the optical axis. In this case, simulations were carried out on the supposition that no light should be incident on the surface 2as of any phase step 2a (see FIG. 14). The tilt direction of the light agrees with the y-axis direction shown in FIG. 16. And each crescent portion that looks white in the circular range shown in FIG. 16 corresponds to the shadow region 6', which has the maximum width in the direction that is parallel to the y-axis. In the design example shown in FIG. 16, there are 24 shadow regions 6', each having a width of 9 mm within a radius of 0.72 mm, on a line that passes the center of the circle and that is parallel to the y-axis. Although the width of the actual shadow region 6' varies from one position to another, the shadow regions 6' are supposed to have a constant width of 9 μm to unify the comparison conditions in the preferred embodiments to be described below.

Figure 17:
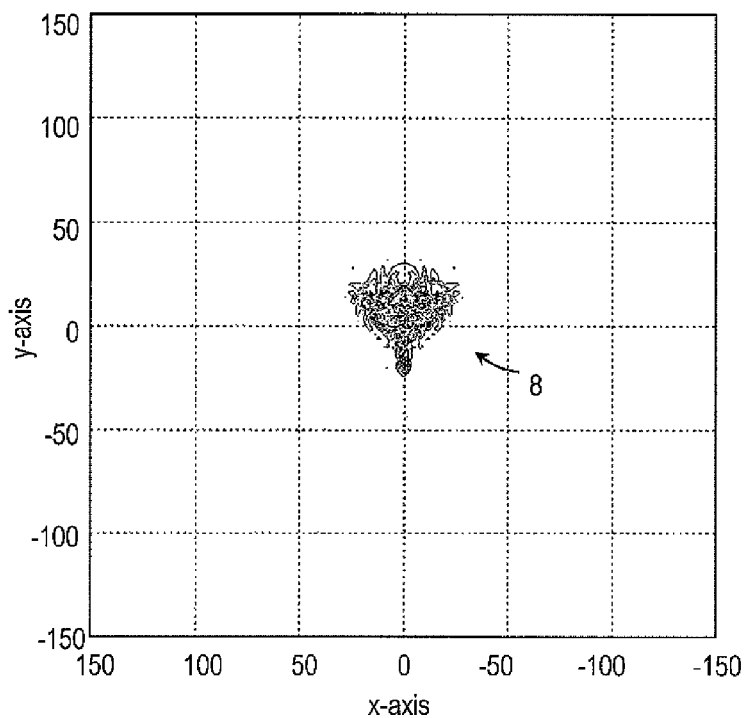
FIG. 17 illustrates light intensity distributions on the image capturing plane, obtained through wave calculations, for the light that was transmitted through a conventional diffraction lens in a situation where an incoming light ray with a wavelength of 0.538 μm was incident at an angle of incidence of 60 degrees with respect to the optical axis, wherein (a) shows the results obtained when there were no shadow regions and (b) shows the results obtained when there were some shadow regions.
Figure 17:
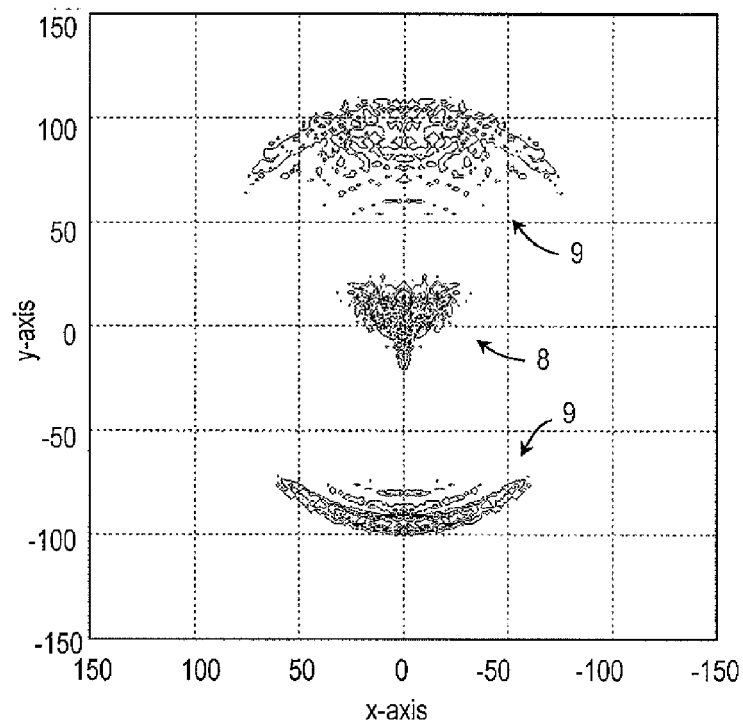

FIG. 17 shows a light intensity distribution on the image capturing plane that was obtained through wave calculations with respect to an incoming light ray 4 that was incident on the diffraction lens with a wavelength of 0.538 μm at an angle of incidence of 60 degrees with respect to the optical axis 3. In FIG. 17, the light intensities between the bottom and the top, i.e., the light intensities on the image capturing plane, are plotted by 10000 divided contours. FIG. 17(*a*) shows the results of calculations on the supposition that there was light, of which the wavefront was continuous with the light transmitted through the ring zone 6, in the shadow region 6' as will be described later. On the other hand, FIG. 17(*b*) shows the result of calculations that were made for a conventional diffraction lens on the supposition that there was a shadow region 6' under the condition shown in FIG. 16. As shown in FIG. 17(*b*), diffraction induced flares 9, which were produced by the diffraction grating, were observed around the focal spot 8. The intensity level of those flares 9 was at most approximately 6/10000 of the peak of the focal spot 8.

As shown in FIG. 17(*a*), if there was light, of which the wavefront was continuous with the light that had been transmitted through the ring zone 6, in the shadow region 6', no such flares 9 were observed. That is why the flares 9 are produced due to the presence of such a shadow region 6'. In other words, the flares 9 are produced because the light is substantially cut off by the phase steps that form the diffraction grating.

With special attention paid to such shadow regions, the present inventors invented a structure for reducing the intensities of those flares to be produced by a diffracted light ray under the influence of the light cut off at the phase steps. Hereinafter, preferred embodiments of a diffractive lens and an image capture device according to the present invention will be described.

Embodiment 1

Hereinafter, a First Specific Preferred Embodiment of a diffractive lens according to the present invention will be described.

Figure 1:
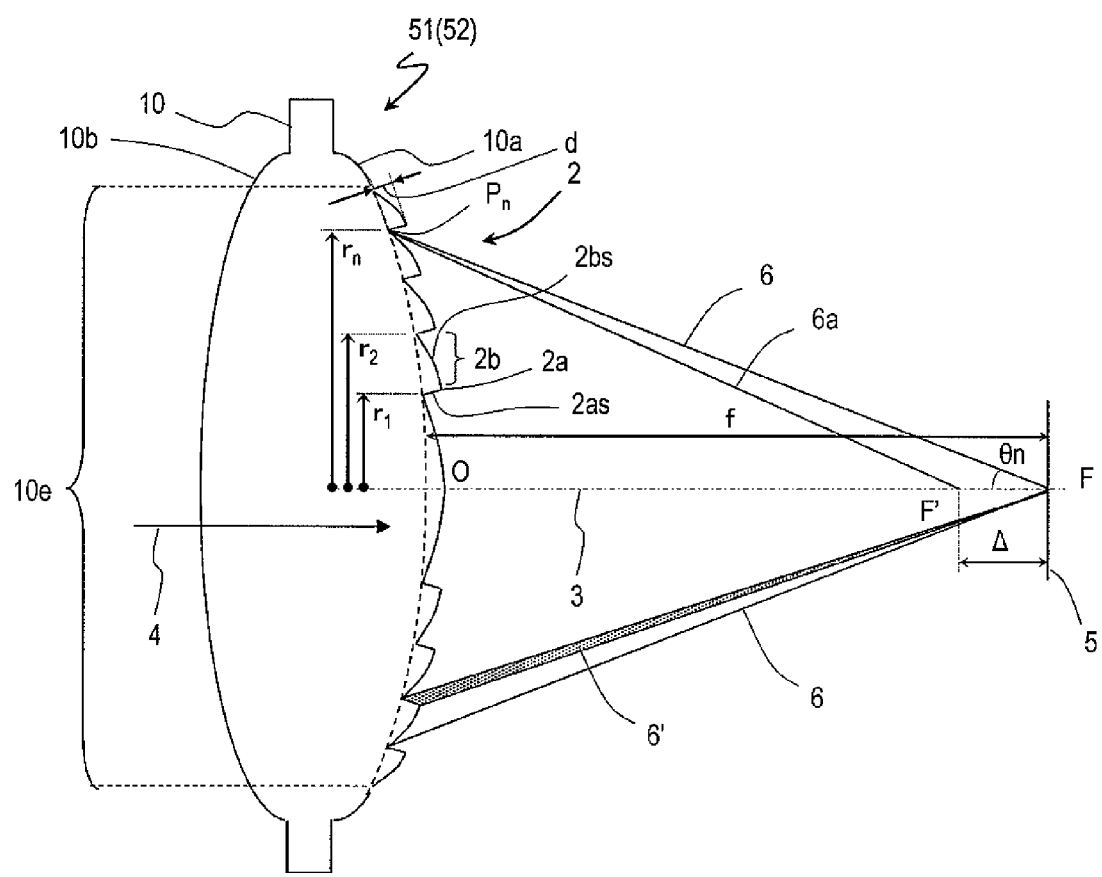
FIG. 1 is a schematic cross-sectional view illustrating first and second preferred embodiments of a diffractive lens according to the present invention.

FIG. 1 is a cross-sectional view illustrating a first preferred embodiment of a diffraction grating lens according to the present invention. The diffraction grating lens 51 of the first preferred embodiment includes a lens body 10, which has first and second surfaces 510*a* and 510*b*. And a diffraction grating 2 has been formed on the first surface 10*a*.

Although the diffraction grating 2 is arranged on the first surface 10*a* in this preferred embodiment, the diffraction grating 2 may also be arranged on the second surface 10*b*, or may even cover both of the first and second surfaces 10*a* and 10*b*.

Also, even though the basic shape of the first and second surfaces 10*a* and 10*b* is an aspheric shape according to this preferred embodiment, the basic shape may also be a spherical shape or a plate shape. The first and second surfaces 51*a* and 51*b* may either have the same basic shape or mutually different basic shapes. Nevertheless, it is still preferred that the surface with the diffraction grating 2 have an aspheric shape or a spherical shape. This is because by providing the diffraction grating 2 for an aspheric or spherical surface, the traveling direction of the incoming light can be changed significantly. Furthermore, the basic shape of the first and second surfaces 10*a* and 10*b* is a convex aspheric shape according to this preferred embodiment, but may also be a concave aspheric shape. Optionally, one of the first and second surfaces 10*a* and 10*b* may have a convex basic shape and the other a concave basic shape.

In this description, the "basic shape" refers to a designed surface shape of the lens body 10, which has not been patterned into the shape of the diffraction grating 2 yet. In other words, unless a structure such as the diffraction grating 2 is formed there, a surface of the lens body 10 keeps its basic shape. For example, since no diffraction grating has been formed on the second surface 10*b* according to this preferred embodiment, the second surface 10*b* still maintains an aspheric shape as its basic shape.

The first surface 10*a* is defined by forming the diffraction grating 2 on the surface with the basic shape (i.e., an aspheric surface). Since the first surface 10*a* has the diffraction grating 2, the first surface 10*a* of the lens body 10 with the diffraction grating 2 no longer has an aspheric shape. However, since the diffraction grating 2 has a shape that is based on a predetermined condition as will be described later, the basic shape of the first surface 10*a* can be determined by subtracting the shape of the diffraction grating 2 from the shape of the first surface 10*a* with the diffraction grating 2. As the basic shape is just a designed shape, the lens body 10 with no diffraction grating 2 yet does not have to have that basic shape.

In the effective area of the diffractive lens 51, the diffraction grating 2 has been formed along the basic shape of the first surface 10*a*. In this description, the "effective area 10*e*" refers to an area of the first and second surfaces 10*a* and 10*b* where the diffractive lens 51 has a focusing function. Thus, if the diffractive lens 51 is used for an image capture device, the effective area refers to an area that contributes to producing an image on the image capturing plane of the image sensor. The diffraction grating 2 has a number of concentric ring zones 2*b*, which are arranged around the optical axis 3 of the diffractive lens 51, and a number of phase steps 2*a*, each of which is located between its associated pair of the ring zones 2*b*. Those phase steps 2*a* are also located on concentric circles that can be drawn around the optical axis 3 and that have mutually different radii.

The height d of each of those phase steps 2*a* can be represented by the following Equation (2):

$$d = \frac{q \cdot \lambda}{n_1(\lambda) - 1} \tag{2}$$

where q is a designed order (e.g., q=1 as for first-order diffracted light), λ is the operating wavelength, and $n_1(\lambda)$ is the refractive index of a lens material that makes the lens body at the operating wavelength λ. The refractive index of a lens material has a wavelength dependence and is a function of the wavelength. In a diffraction grating that satisfies this Equation (2), the phase difference between the root and the end of a phase step becomes 2π on the phase function, and the optical path difference with respect to light with the operating wavelength λ becomes an integral number of times as long as the wavelength. Consequently, the diffraction efficiency of $q^{th}$-order diffracted light (which will be referred to herein as "$q^{th}$-order diffraction efficiency") with respect to light with the operating wavelength can be approximately equal to 100%.

However, even if the diffraction efficiency is not 100% but if Equation (2) is substantially satisfied, the diffractive lens 51 can still have a good enough focusing function in practice. Specifically, if the height d of the phase steps 2a satisfies the following Inequality (3)

$$0.9 \times \frac{q \cdot \lambda}{n_1(\lambda)-1} \leq d \leq 1.1 \times \frac{q \cdot \lambda}{n_1(\lambda)-1} \quad (3)$$

then the diffractive lens 51 can still have a good enough focusing function in practice and can substantially satisfy Equation (2).

In this diffractive lens 51, the surface 2bs of the ring zones 2b of the diffraction grating 2 can be formed on the first surface 10a of the lens body 10 by superposing the shape of the diffraction grating on the basic shape as described above. Consequently, by using both the refraction effect produced by the basic shape and the diffraction effect produced by the diffraction grating 2, the diffractive lens 51 can focus the incoming light ray 4 onto the point F on the image capturing plane 5 of the image sensor.

However, as in the conventional diffractive lens, the outgoing light that passes through the surface 2as of each phase step 2a does not contribute to focusing the light onto the focal point F. That is why in the range 6' that surrounds the surface 2as of a phase step 2a and the focal point F, there is substantially no light that leaves the surface 2as and eventually reaches the point F, and the range becomes a shadow region 6'.

As described above, the diffraction induced flares would be produced because the light that has been transmitted through the diffractive lens 51 and could contribute to focusing the incoming light is substantially blocked by the phase steps 2b of the diffraction grating 2 to cast such shadow regions. Thus, to minimize such diffraction induced flares, according to the present invention, the phase steps 2b are arranged at predetermined positions. Specifically, if the position of each phase step 2a is represented by a radius $r_n$ that is defined with respect to the optical axis 3 as shown in FIG. 1, the radius $r_n$ representing the position of the $n^{th}$ phase step 2a as counted from the center O should satisfy the following Equation (4):

$$r_n = \sqrt{a(n+c+d_n)} \quad (4)$$

where a and c are constants that satisfy a>0 and 0≤c<1 and $d_n$ is an arbitrary value that satisfies $-0.25<d_n<0.25$. Also, if the number of the phase steps 2a is represented by $n_0$, then n is an integer that falls within the range of 0 through $n_0$ and Equation (4) is satisfied with respect to every n. In one diffractive lens 51, each of a and c is a single value that satisfies the condition specified above but $d_n$ may be different from one phase step 2b to another. That is to say, $d_1, d_2, \ldots$ and $d_{n0}$ may be different from each other.

c corresponds to a constant term in the phase function and has something to do with a position where the phase step 2a starts. If the phase difference (optical path difference) of the diffraction grating 2 is designed with respect to the center O, then c=0. $d_n$ corresponds to the position accuracy of each phase step 2a. $-0.25<d_n<0.25$ indicates that the aberration caused by the positional error is less than 0.25 wavelength.

If c=$d_n$=0, Equation (4) indicates that the position of the phase step 2a complies with the root rule. That is to say, supposing the first phase step has a radius of one, then the $n^{th}$ phase step will have a radius of $n^{1/2}$. In the following description, a situation where c and $d_n$ are equal to zero will be described for the sake of simplicity.

In this case, the phase difference function ϕ(r) of the diffraction grating 2 satisfies the following Equation (5):

$$\phi(r_n) - \phi(r_{n-1}) = 2q\pi \quad (5)$$

where q is an integer.

Figure 2:
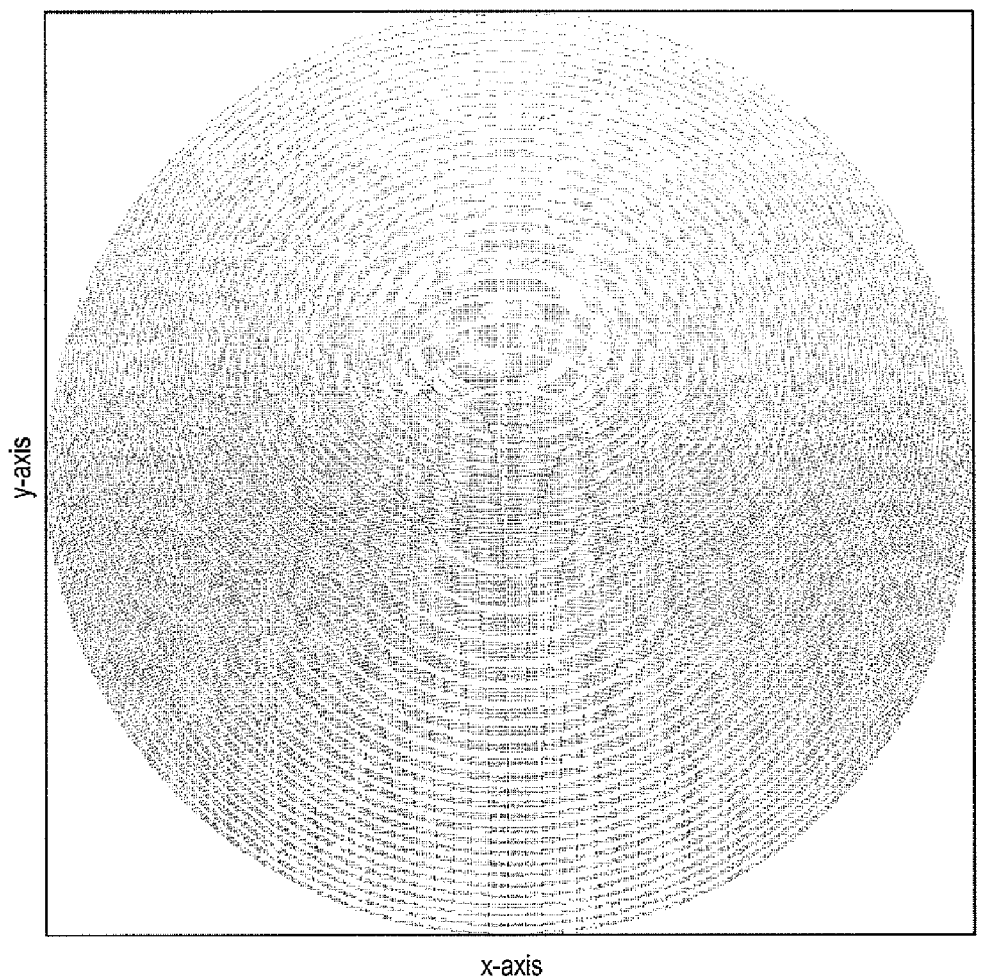
FIG. 2 is a spot diagram illustrating light rays that have just been transmitted through a diffraction grating in a situation where light is incident on the diffractive lens of the first preferred embodiment at an angle of incidence of 60 degrees with respect to the optical axis.

FIG. 2 is a spot diagram illustrating light rays that have just been transmitted through the diffraction grating on the last surface in a situation where the light was incident at an angle of incidence of 60 degrees with respect to the optical axis. As in the spot diagram of the conventional diffractive lens, the tilt direction of the light agrees with the y-axis direction shown in FIG. 2. And each shadow region 6' that looks white in the circular range shown in FIG. 2 is a region that does not contribute to focusing the light onto the focal point F. There are twenty-four shadow regions 6', each having a width of 9 μm, within a radius of 0.72 mm but their positions satisfy Equation (4), i.e., complies with the root rule. Since the crescent regions shown in FIG. 2 are located at different positions from their counterparts shown in FIG. 16, the diffraction induced flares can be minimized.

The influence of the shadow regions 6' on the distribution of light on the image capturing plane 5 can be estimated as follows by the Babinet's principle:

(amplitude distribution of diffracted image of light that passes through shadow regions)+(amplitude distribution of diffracted image of light that passes through the other regions)=(amplitude distribution of diffracted image of light that passes through entire area[shadow regions+the other regions]) (6)

where the "light that passes through shadow regions" refers to the light, of which the intensity and wavefront are continuous with the light that passes through the other regions. That is why the following relation is obtained:

(amplitude distribution of diffracted image of light that passes through the other regions)=(amplitude distribution of diffracted image of light that passes through entire area)−(amplitude distribution of diffracted image of light that passes through shadow regions) (7)

In the amplitude distribution of the diffracted image of the light that passes through the entire area, there are no flares 9 around the focal spot 8 as shown in FIG. 17(a). That is why the flares that appear on the diffracted image of the light that passes through the regions other than the shadow regions 6' are equivalent to the diffracted image of the light that passes through the shadow regions 6'. As described above, the "light that passes through the shadow regions" refers to the light, of which the intensity and wavefront are continuous with the light that passes through the other regions. In other words, if the light, of which the wavefront is continuous with that of the light that passes through the other regions (i.e., the ring zones), is defined by the shadow regions 6', then it means the light that passes through, and gets diffracted by, the shadow regions. Thus, the "light that passes through the shadow regions" will be used in these senses in the following description.

It should be noted that if light has been incident on the diffractive lens 51 of this preferred embodiment, actually there is no "light that passes through the shadow regions". Actually, when the light is transmitted through the surface 2bs of the ring zones 2b, the wavefront of the light being transmitted through both ends of that surface 2bs would reach, and would get diffracted by, the shadow regions 6', thus causing the diffraction induced flares. The "light that passes through the shadow regions" has substantially the same amplitude distribution as, and the opposite phase to, the light that has reached the shadow regions 6'. That is why if there was such "light that passes through the shadow regions", then that light would cancel the light that reaches the shadow regions 6' and no flares would be produced in that case.

It should be noted that in this analysis, the outgoing light that actually passes through the surface 2as of the phase steps 2a is not taken into consideration. As described above, such outgoing light that actually passes through the surface 2as of the phase steps 2a becomes stray light and does not come to have intensity or wavefront that is continuous with that of the light that passes through the other regions. For that reason, the "light that passes through the shadow regions" does not refer to such stray light.

Each of the shadow regions 6' is a conical region, of which the bottom is defined by the surface 2as of its associated phase step 2a and of which the vertex is defined by the focal point F of the diffractive lens 51. More specifically, the shadow region 6' is defined by rotating a triangle, which is drawn by connecting both ends of a line segment that is defined by an intersection between a plane including the optical axis 3 of the diffractive lens 51 and the surface 2as of each phase step 2a to the focal point F of the diffractive lens 51, around the optical axis 3.

According to the present invention, the diffracted light produced when the light that has been transmitted through the ends of the ring zones 2b reaches the shadow regions 6' is not directly taken into consideration but the "light that passes through the shadow regions" that has the opposite phase to that diffracted light is taken into consideration. Hereinafter, the diffracted image of the light that passes through the shadow regions will be considered. If the light that passes through the regions other than the shadow regions 6' is focused on a focal point F on the image capturing plane 5 as shown in FIG. 1 and if the light that passes through a shadow region associated with the $n^{th}$ phase step 2ab as counted from the center is focused on a point F', which is Δ away from the image capturing plane 5, the difference in optical path length ($F'P_n - FP_n$) from a situation where the light is focused on the focal point F is represented by the following Equation (8):

$$(F'P_n - FP_n) = -\Delta \cdot \cos \theta_n \tag{8}$$

where Pn is an arbitrary point on the surface 2as of the $n^{th}$ phase step 2ab and $\theta n = \angle PnFO$.

The center O corresponds to the position $P_0$ of the zeroth (i.e., $\theta_0 = 0$) phase step 2a. Thus, if the optical path length difference Δ with respect to that zeroth phase step 2a (which is located on the optical axis 3) is used as a reference, the phase difference $\delta_n$ of the light that passes through the shadow region associated with the $n^{th}$ phase step is given by the following Equation (9):

$$\delta_n = (1 - \cos \theta_n) \cdot \Delta \tag{9}$$

If the numerical aperture is relatively small with respect to the converged light, $\theta_n$ is also small, and Equation (9) can be approximated as the following Equation (10):

$$\text{phase difference } \delta_n \approx \theta_n^2 \cdot \Delta / 2 \tag{10}$$

On the other hand, if the numerical aperture is relatively great with respect to the converged light, the following Equation (11) is satisfied:

$$\theta_n \approx r_n / f \tag{11}$$

where f=OF.

Consequently, the phase difference $\delta_n$ is calculated by the following Equation (12):

$$\delta_n \approx r_n^2 \Delta / (2f^2) \tag{12}$$

If in Equation (12), Δ satisfies the following Equation (13) and the phase step satisfies the relation represented by Equation (4), then Equation (12) can be modified into the following Equation (14):

$$\Delta = 2f^2 \lambda / a \tag{13}$$

$$\delta_n = n\lambda \tag{14}$$

That is to say, the light that passes through the shadow region associated with each phase step 2a is always focused on the point F' irrespective of the wavelength (i.e., with no aberration at all). As described above, the light that passes through the shadow region and the diffracted light produced when the light that has been transmitted through the ends of each ring zone 2b reaches the shadow region 6' have mutually opposite phases but substantially the same amplitude distribution. Consequently, it can be said that the light that passes through the shadow region and the diffracted light produced when the light that has been transmitted through the ends of each ring zone 2b reaches the shadow region 6' are also focused on the point F', irrespective of their wavelengths.

Figure 3:
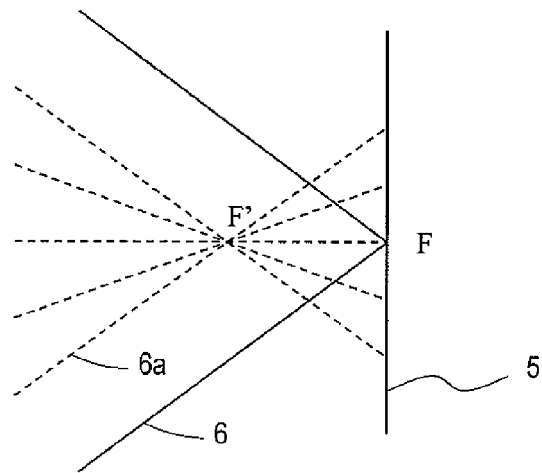
FIG. 3(a) is a ray tracing diagram illustrating how the diffractive lens of the first preferred embodiment focuses light.
FIG. 3(b) is a ray tracing diagram illustrating how the diffractive lens of the first preferred embodiment focuses minus-first-order diffracted light.
FIG. 3(c) is a ray tracing diagram illustrating how a conventional diffractive lens focuses light.
Figure 3:
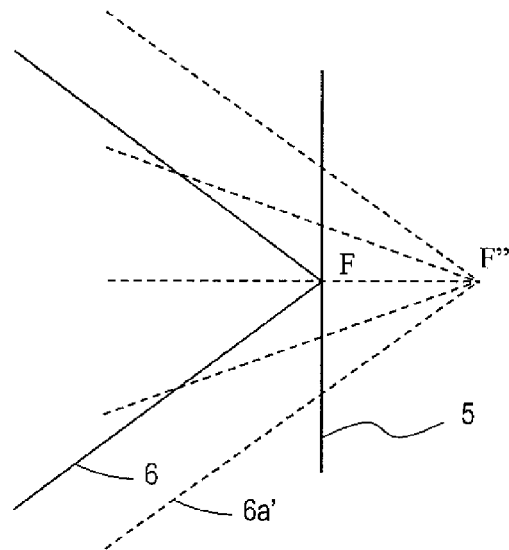
Figure 3:
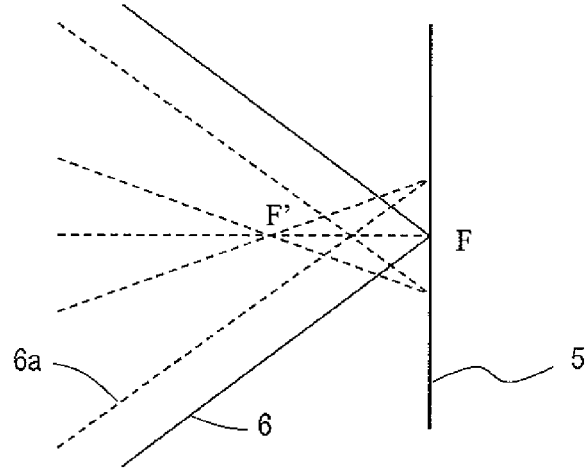

FIG. 3(a) is a ray tracing diagram illustrating how the diffractive lens 51 focuses light. The point F is the focal point of the light ray 6 converged by the diffractive lens 51. If the diffracted light of the light that passes through the shadow region (which is illustrated as a bundle of rays 6a) is focused on the point F' with no aberration at all, then it means, according to the ray tracing, that those rays 6a in the bundle converges toward that one point F' as shown in FIG. 3(a). After having passed through that point F', this bundle of rays 6a reaches the image capturing plane 5 without intersecting with each other. If the bundle of rays 6a never intersects with each other on the image capturing plane 5, then it means, from a wave optics point of view, that there is little interference between those rays. Consequently, the diffracted light of the bundle of rays 6a is distributed uniformly over the image capturing plane 5 without increasing their degree of interference and can have their light intensity locally minimized. That is to say, the flares that appear on the diffracted image of the light that passes through the regions other than the shadow regions can have their interference minimized on the image capturing plane. This effect can be achieved if the focal point F' of the light that passes through the shadow regions is located closer to the diffractive lens 51 than the focal point F of the light that passes through the other regions is (i.e., if Δ is a positive value). And to make Δ a positive value, a>0 needs to be satisfied in Equation (13). That is why it can be said that if the position of the phase step 2a satisfies Equation (4), then Equation (13) is satisfied.

According to this preferred embodiment, the diffracted light of the light that passes through the shadow region associated with each phase step 2a is always focused on the point F' irrespective of the position of the phase step 2a. That is why the distance between the focal point F of the light that has been transmitted through the surface 2bs of the $n^{th}$ ring zone 2b as counted from the optical axis 3 and the focal point F' of the light that passes through the shadow region associated with the $n^{th}$ phase step 2a as counted from the optical axis 3 is always constant irrespective of the value of n.

The light that converges toward the point F' is first-order diffracted light, which has passed through the shadow region and then has been diffracted. On the other hand, the zero-order diffracted light corresponds to the converged light ray 6. In addition, actually there is a bundle of rays 6a' that converges toward a point F''', which is located symmetrically to the point F' with respect to the image capturing plane 5, as minus-first-order diffracted light as shown in FIG. 3(b). However, the pattern formed by that bundle of rays 6a' when intersecting with the image capturing plane 5 is the same as the one formed by the bundle of rays 6a when intersecting with the image capturing plane 5. That is why as to how interference of light will be produced on the image capturing plane 5, the interference produced by the minus-first-order diffracted light can be easily estimated by checking out the bundle of rays 6a. For that reason, only the bundle of rays 6a of the first-order diffracted light will be described not only in this preferred embodiment but also other preferred embodiments of the present invention to be described later.

FIG. 3(c) is a ray tracing diagram illustrating how a conventional diffractive lens focuses light. Unlike the diffractive lens 51 of this preferred embodiment, the bundle of rays 6a never converges toward one point in the conventional diffractive lens. Also, some of the rays in the bundle 6a always intersect with each other on the image capturing plane 5, and the density of the rays on the image capturing plane 5 becomes high somewhere but low elsewhere. Consequently, there is an increased degree of interference of light on the image capturing plane 5. As a result, flares 9 are produced as shown in FIG. 17(b).

As described above, in the diffractive lens 51 of this preferred embodiment, the phase steps 2a are arranged at such positions that satisfy Equation (4), and therefore, the diffracted light of the light 6a that passes through a shadow region is focused on the point F', which is located closer to the diffractive lens 51 than the focal point F of the diffraction grating 2 is, irrespective of the wavelength as shown in FIG. 3(a). Also, after having passed through the point F', those rays reach the image capturing plane 5 without intersecting with each other or increasing the degree of their interference. That is to say, the flares that appear on the diffracted image of the light that passes through regions other than the shadow regions can have their interference reduced on the image capturing plane. As a result, the diffraction induced flares can be minimized.

However, if light is incident obliquely with respect to the optical axis of a diffractive lens, then the diffracted light of the light that passes through the shadow region is not focused without aberrations. Nevertheless, since the diffraction induced flares can be reduced significantly if the light is incident parallel to the optical axis, intersection between the light rays on the image capturing plane 5 and the degree of their interference can still be reduced significantly even when light is incident obliquely with respect to the optical axis.

Also, the magnitude of an optical phase shift to be caused by the phase steps also varies according to the angle of incidence of the light. As a result, diffracted light of non-designed orders could be produced and could induce flares. However, when it comes to focusing light, those flares will behave in a similar manner to the diffracted light of the light that passes through the shadow regions. Consequently, according to the principle described above, the maximum intensity of the flares to be caused by diffracted light of non-designed orders (i.e., so-called "light of unwanted orders of diffraction") can be reduced with the same condition adopted.

The diffractive lens 51 is designed by a different method from conventional ones. Specifically, according to a conventional diffractive lens design process using a retailed optical design software program, multiple aspheric surface coefficients that define the aspheric surface of a diffractive lens and multiple phase coefficients that define the phase function of the diffraction grating are just treated as independent parameter without being classified, and their optimum values are obtained inductively so as to achieve the required optical performance. According to such a method, however, just the optical performance has to be achieved by the overall arrangement, and nobody knows exactly where the phase steps are positioned in the diffraction grating until the solution comes out. In most cases, to eliminate high-order aberrations to be produced by some members on the refracting end, some high-order components almost always remain in the phase function and the positions of the phase steps rarely satisfy Equation (4). Also, in many cases, convergence is achieved to satisfy b<0 because a greater number of phase steps can be arranged in that case.

On the other hand, when the diffractive lens 51 of this preferred embodiment is designed, first of all, the positions of the phase steps are determined by Equation (4). Since the phase difference between two adjacent phase steps is $2\pi$ (or $2q\pi$), to determine the positions of the phase steps means determining the phase function first. Next, using, as parameters, the aspheric surface coefficients of a function that determines a basic shape such as an aspheric shape, the parameters are determined so as to achieve the optical properties required.

Figure 4:
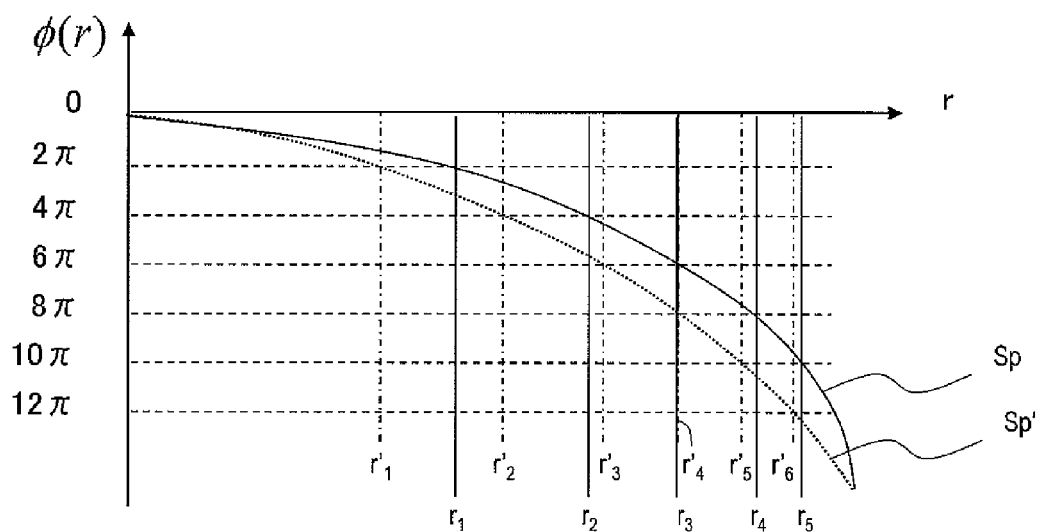
FIG. 4 shows respective phase function profiles and phase step positions in the diffractive lens of the first preferred embodiment and in a conventional diffractive lens.

FIG. 4 schematically illustrates an example of a phase function sp' determined by a conventional diffractive lens and an example of a phase function Sp for the diffractive lens 51 of this preferred embodiment. As described above, in the conventional diffractive lens, after the phase function has been determined, the positions $r'_1, r'_2, r'_3, r'_4, \ldots$ of phase steps are determined every time a position where a phase difference of $2\pi$ is obtained is reached with respect to the reference position (e.g., the origin in FIG. 4). On the other hand, in the design process of the diffractive lens 51 of this preferred embodiment, first of all, the positions $r_1, r_2, r_3, r_4, \ldots$ of phase steps are determined by Equation (4). As can be seen from FIG. 4, compared to the conventional diffractive lens, the phase step pitch of the diffractive lens 51 of this preferred embodiment decreases more steeply from the center of the lens toward its periphery.

Figure 5:
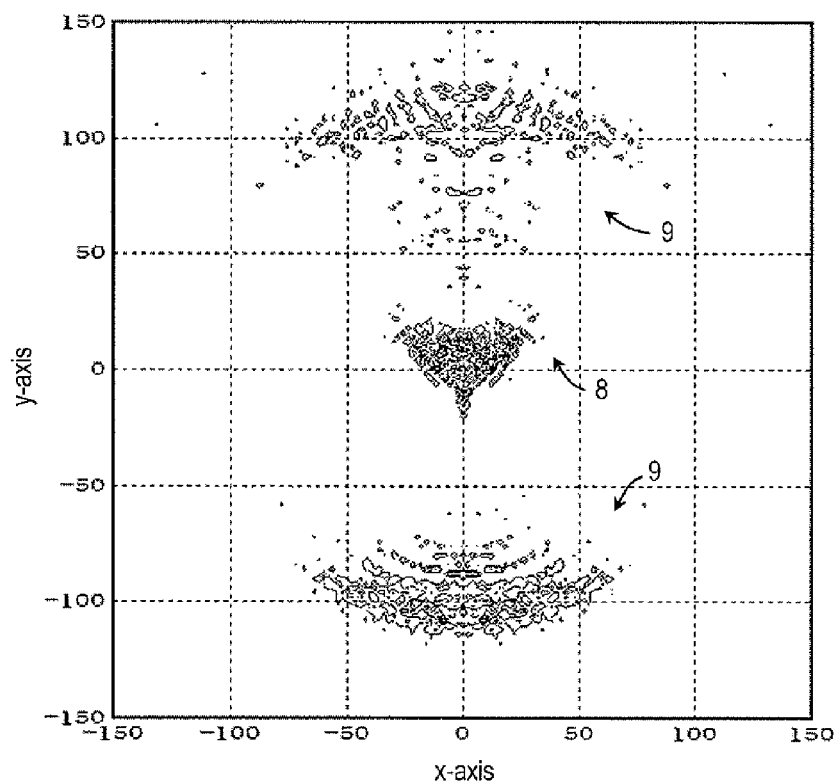
FIG. 5 shows a light intensity distribution on the image capturing plane that was obtained through wave calculations with respect to the light that was incident on the diffraction grating of the first preferred embodiment with a wavelength of 0.538 μm and at an angle of incidence of 60 degrees with respect to the optical axis.

FIG. 5 shows a light intensity distribution on the image capturing plane that was obtained through wave calculations with respect to the light that was incident on the diffraction lens 51 with a wavelength of 0.538 μm and at an angle of incidence of 60 degrees with respect to the optical axis. In FIG. 5, the light intensities between the bottom and the top, i.e., the light intensities on the image capturing plane, are plotted by 10000 divided contours. The width and number of the shadow regions are the same as in the example shown in FIG. 17. It can be seen that the intensity level of the diffraction induced flares 9 caused by the diffraction grating around the focal spot 8 was at most approximately 3/10000 of the peak of the focal spot 8, which is approximately a half of the conventional one.

Embodiment 2

Hereinafter, a second preferred embodiment of a diffractive lens according to the present invention will be described with reference to FIG. 1. In the diffractive lens 52 of this second preferred embodiment, the phase steps 2a are arranged at different positions from their counterparts of the diffractive lens 51 of the first preferred embodiment described above. Thus, the following description of this second preferred embodiment will be focused on the exact positions of those phase steps 2a.

In this diffractive lens 52, if the position of each phase step 2a is represented by a radius $r_n$ that is defined with respect to the optical axis 3, the radius $r_n$ representing the position of the $n^{th}$ phase step 2a as counted from the center O should satisfy the following Equation (15):

$$r_n = \sqrt{a\{(n+c+d_n) - b(n+c+d_n)^m\}} \quad (15)$$

In Equation (15), a, b, c and m are constants that satisfy a>0, b>0, 0≤c<1, and m>1, and $d_n$ is an arbitrary value that satisfies $-0.25 < d_n < 0.25$. Also, if the number of the phase steps 2a is represented by $n_0$, then n is an integer that falls within the range of 0 through $n_0$ and Equation (15) is satisfied with respect to every n. In one diffractive lens 52, each of a, b and c is a single value that satisfies the condition specified above but $d_n$ may be different from one phase step 2b to another. That is to say, $d_1, d_2, \ldots$ and $d_{n0}$ may be different from each other.

A major difference from the first preferred embodiment is that Equation (15) includes the b term. As in the first preferred embodiment described above, c corresponds to a constant term in the phase function and has something to do with a position where the phase step 2a starts. If the phase difference (optical path difference) of the diffraction grating 2 is designed with respect to the center O, then c=0. $d_n$ corresponds to the position accuracy of each phase step 2a. $-0.25 < d_n < 0.25$ indicates that the aberration caused by the positional error is less than 0.25 wavelength. In the following description, a situation where c and $d_n$ are equal to zero will be described for the sake of simplicity.

If m>1 and b>0 are both satisfied, Equation (15) means that the phase step is located at an inner position (i.e., closer to the optical axis) than in the first preferred embodiment (where b=0) described above and the trend grows as n increases.

If the radius of the phase step is r, the phase step number as counted from the center is x, and x is supposed to be a real number, then Equation (15) is modified into the following Equation (16):

$$r = \sqrt{a(x - bx^m)} \quad (16)$$

Consequently, the following Equation (17) is satisfied:

$$\frac{dr}{dx} = \frac{a(1 - mbx^{m-1})}{2\sqrt{a(x - bx^m)}} \quad (17)$$

If b satisfies the following Inequality (18) in Equation (17), the following Inequality (19) is satisfied.

$$b < \frac{1}{mx^{m-1}} \quad (18)$$

$$\frac{dr}{dx} > 0 \quad (19)$$

If the total number of the phase steps 2a in the effective area 10e of the diffractive lens 52 is $n_0$ (e.g., $n_0$=24 in the example illustrated in FIG. 2), the maximum value of x is $n_0$ and the following Inequality (20) is satisfied. This Inequality (20) becomes a condition that needs to be met to prevent the interval between two adjacent phase steps 2a from becoming zero:

$$0 < b < b_0 \quad (20)$$

where $b_0$ satisfies the following Equation (21):

$$b_0 = \frac{1}{mn_0^{m-1}} \quad (21)$$

Figure 6:
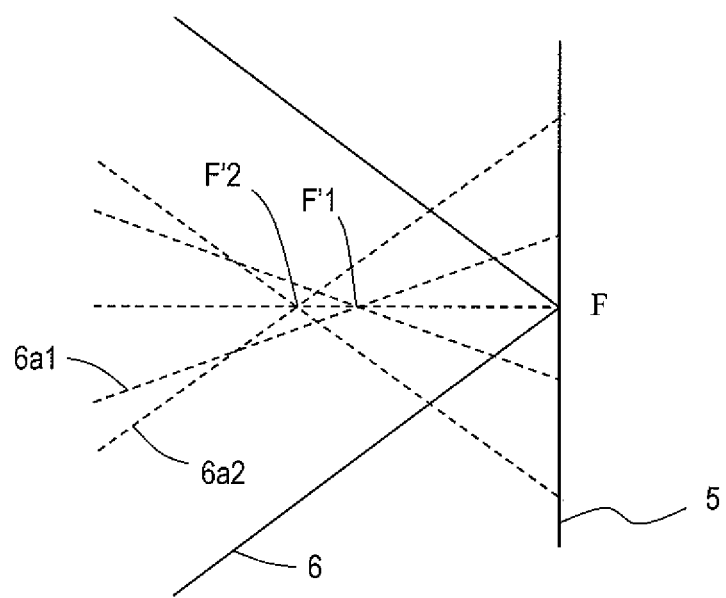
FIG. 6 is a ray tracing diagram illustrating how a diffractive lens according to the second preferred embodiment focuses light.

FIG. 6 is a ray tracing diagram illustrating how the diffractive lens 52 of this second preferred embodiment focuses light. In the case of this diffractive lens 52, not all of the rays that pass through the shadow regions converge toward the same focal point. Specifically, a light ray 6a1 that passes through a shadow region associated with a phase step 2a that is located close to the optical axis converges toward the vicinity of the point F'. On the other hand, the closer to the outer edge the phase step 2a associated with a shadow region that a light ray 6a2 passes through, the closer to the diffractive lens 52 the focal point F'2 of the light ray gets. That is to say, according to this preferred embodiment, the distance between the focal point of a light ray that is transmitted through the surface of an $n^{th}$ ring zone 2b as counted from the optical axis 3 and that of a light ray that passes through the shadow region associated with the $n^{th}$ phase step as counted from the optical axis 3 increases as n increases.

However, even if the light rays 6a1 and 6a2 that are transmitted through the surface 2as of the phase steps 2a travel in this manner, those light rays 6a1 and 6a2 do not intersect with each other on the image capturing plane 5, either, just like the first preferred embodiment described above. But the interval between those two light rays 6a1 and 6a2 on the image capturing plane 5 becomes wider than in the first preferred embodiment. Consequently, the diffracted light of the light rays 6a1 and 6a2 just diffuse on the image capturing plane 5 without interfering with each other, and therefore, the flares can be reduced even more significantly than in the first preferred embodiment.

As in the first preferred embodiment described above, if light is incident obliquely with respect to the optical axis of the diffractive lens 52, then the diffracted light of the light that passes through the shadow region is not focused without aberrations. Nevertheless, since the diffraction induced flares can be reduced significantly if the light is incident parallel to the optical axis, intersection between the light rays on the image capturing plane 5 and the degree of their interference can still be reduced significantly even when light is incident obliquely with respect to the optical axis. That is to say, the flares can still be reduced significantly even in such a situation.

Figure 7A:
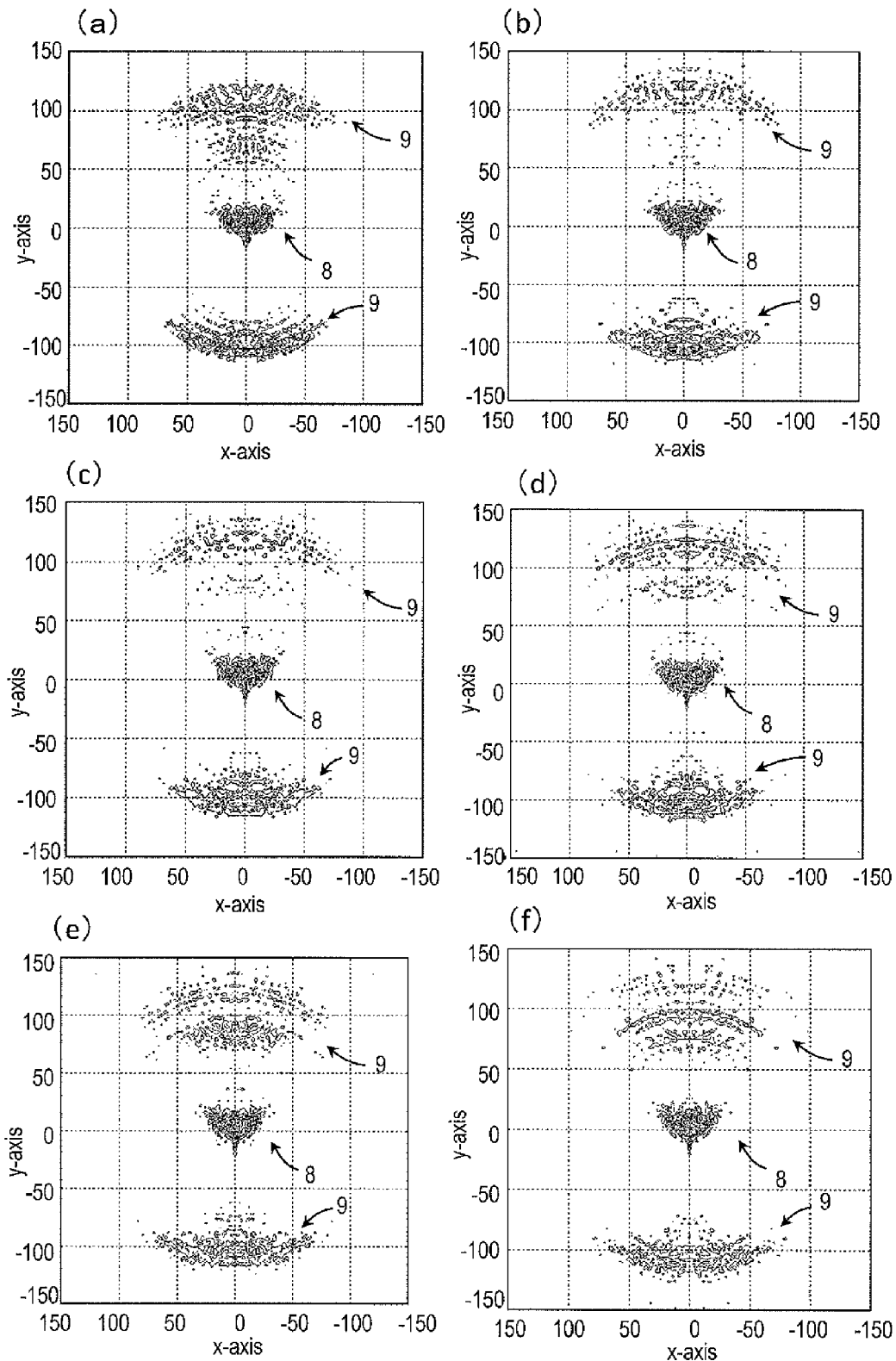
FIG. 7A shows light intensity distributions on the image capturing plane that were obtained through wave calculations with respect to the light that was incident on the diffractive lens of the second preferred embodiment (where m=1.5) with a wavelength of 0.538 μm and at an angle of incidence of 60 degrees with respect to the optical axis, wherein portions (a), (b), (c), (d), (e) and (f) show the results obtained when $b/b_0$=−0.05, when $b/b_0$=0.05, when $b/b_0$=0.075, when $b/b_0$=0.10, when $b/b_0$=0.15, and when $b/b_0$=0.20, respectively.
Figure 7B:
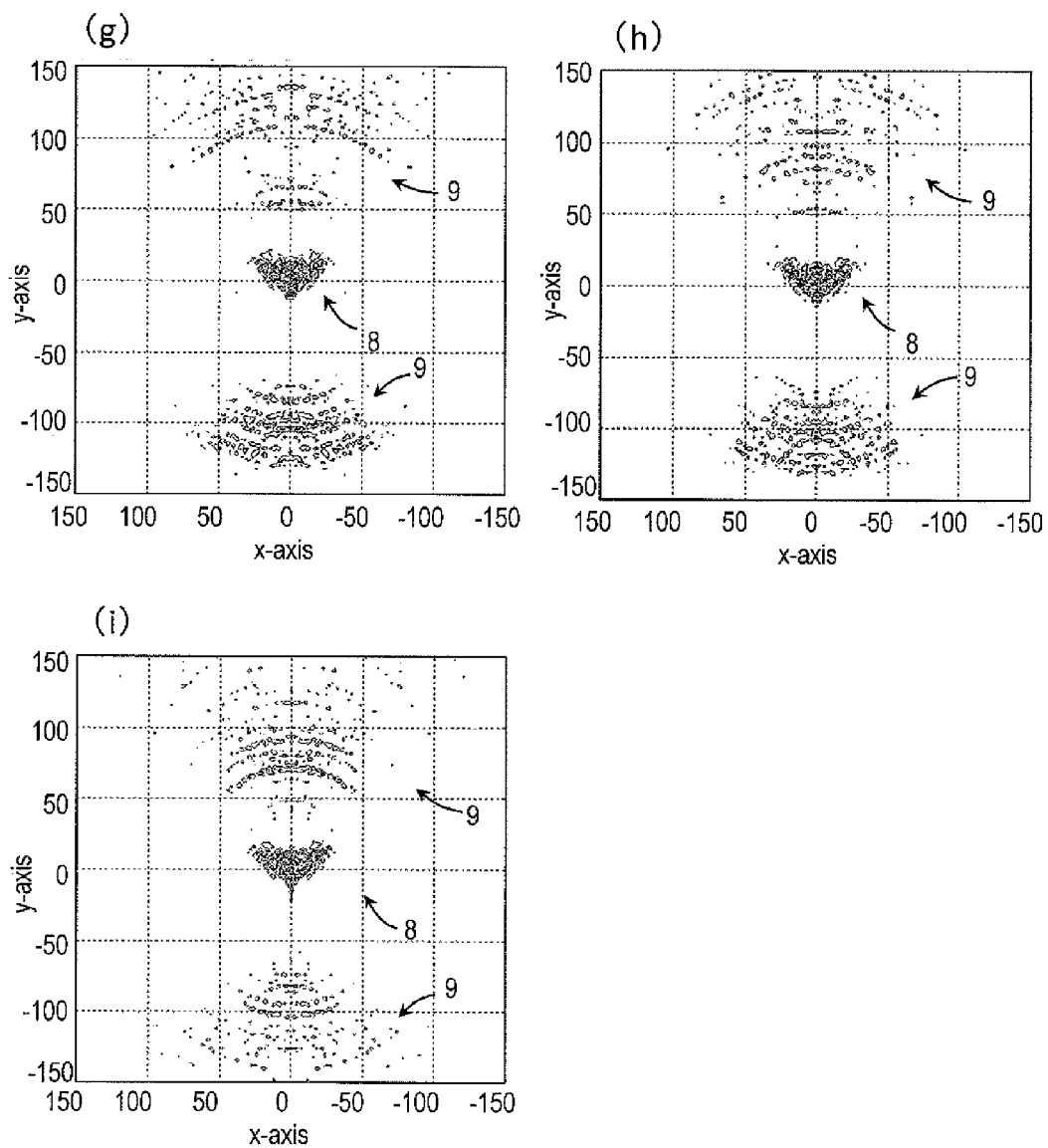
FIG. 7B shows light intensity distributions on the image capturing plane that were obtained through wave calculations with respect to the light that was incident on the diffractive lens of the second preferred embodiment (where m=1.5) with a wavelength of 0.538 μm and at an angle of incidence of 60 degrees with respect to the optical axis, wherein portions (g), (h), and (i) show the results obtained when $b/b_0$=0.30, when $b/b_0$=0.40, and when $b/b_0$=0.50, respectively.
Figure 7C:
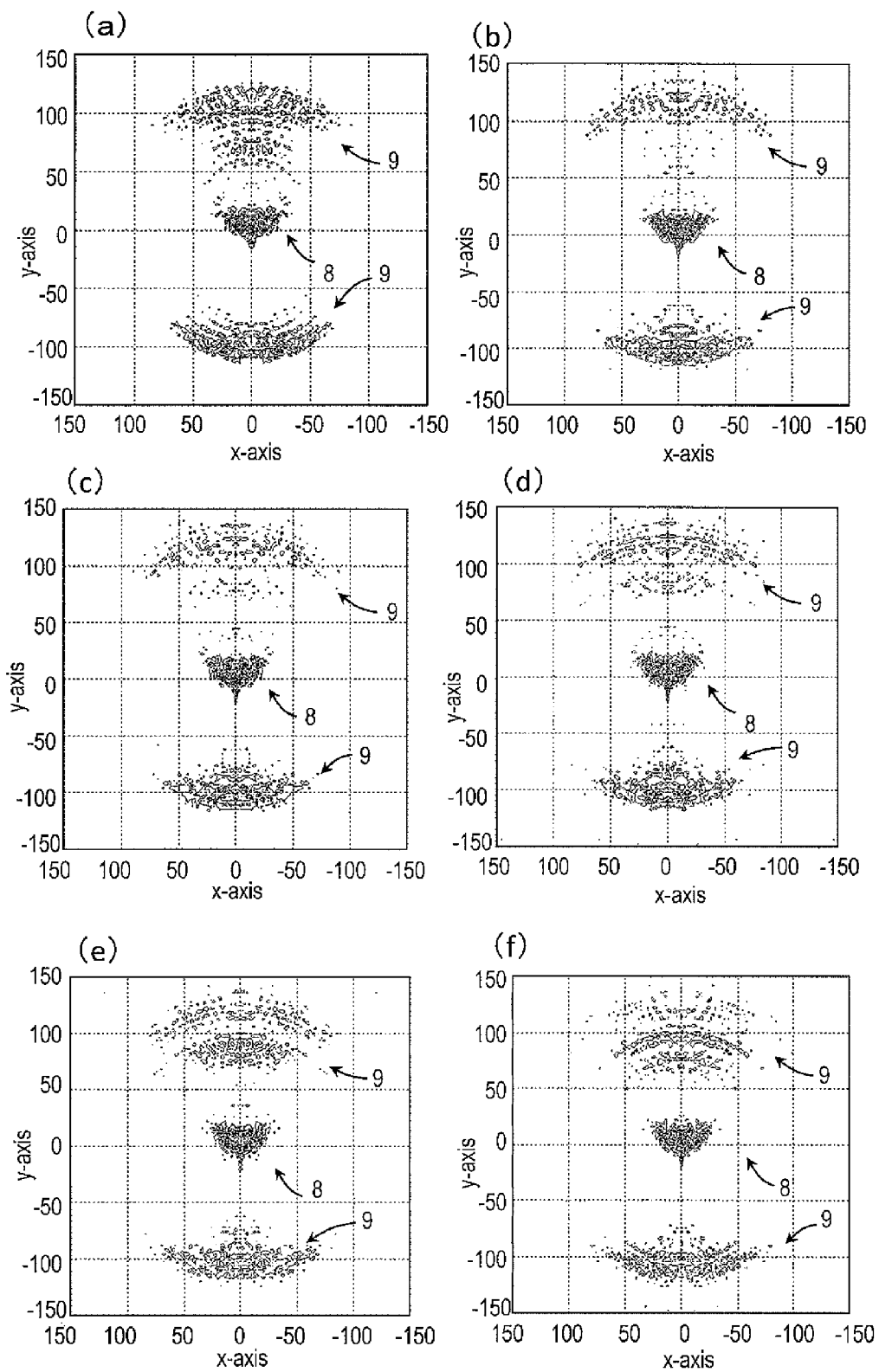
FIG. 7C shows light intensity distributions on the image capturing plane that were obtained through wave calculations with respect to the light that was incident on the diffractive lens of the second preferred embodiment (where m=2.0) with a wavelength of 0.538 μm and at an angle of incidence of 60 degrees with respect to the optical axis, wherein portions (a), (b), (c), (d), (e) and (f) show the results obtained when $b/b_0=-0.05$, when $b/b_0=0.05$, when $b/b_0=0.075$, when $b/b_0=0.10$, when $b/b_0=0.15$, and when $b/b_0=0.20$, respectively.
Figure 7D:
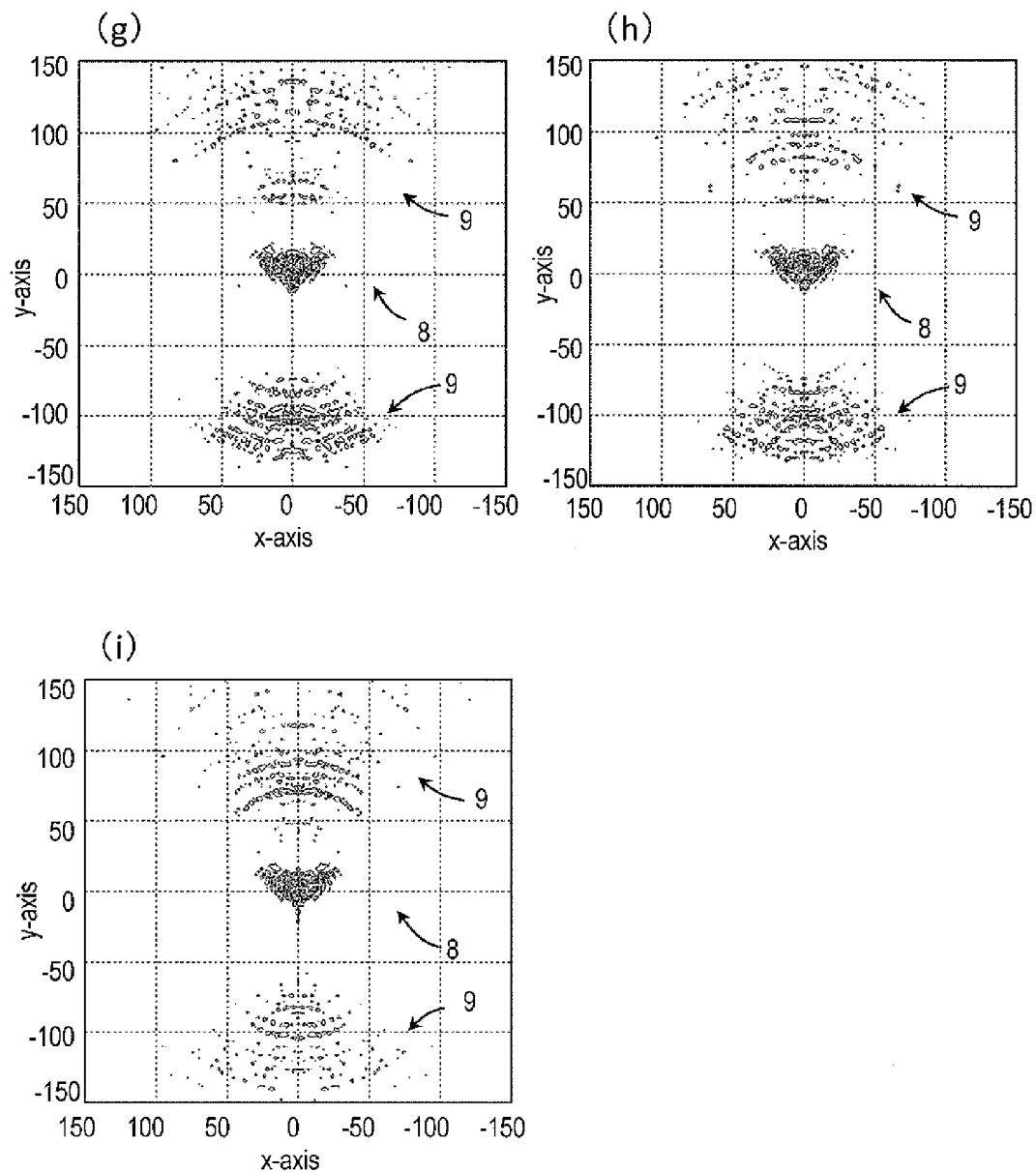
FIG. 7D shows light intensity distributions on the image capturing plane that were obtained through wave calculations with respect to the light that was incident on the diffractive lens of the second preferred embodiment (where m=2.0) with a wavelength of 0.538 μm and at an angle of incidence of 60 degrees with respect to the optical axis, wherein portions (g), (h), and (i) show the results obtained when $b/b_0=0.30$, when $b/b_0=0.40$, and when $b/b_0=0.50$, respectively.

Each of portions (a) through (f) of FIG. 7A, portions (g) through (i) of FIG. 7B, portions (a) through (f) of FIG. 7C and portions (g) through (i) of FIG. 7D shows a light intensity distribution on the image capturing plane that was obtained through wave calculations with respect to the light that was incident on the diffraction lens 52 with a wavelength of 0.538 μm and at an angle of incidence of 60 degrees with respect to the optical axis. In these drawings, the light intensities between the bottom and the top, i.e., the light intensities on the image capturing plane, are plotted by 10000 divided contours. The width and number of the shadow regions are the same as in the example shown in FIG. 17.

The following Table 1 summarizes what m and b combinations were used in Equation (15) to obtain the results of calculations shown in these drawings. In this case, each b value was normalized with its upper limit value $b_0$:

TABLE 1

| Drawing # | M | b/b₀ |
|---|---|---|
| (a) of FIG. 7A | 1.5 | −0.050 |
| (b) of FIG. 7A | 1.5 | 0.050 |
| (c) of FIG. 7A | 1.5 | 0.075 |
| (d) of FIG. 7A | 1.5 | 0.10 |
| (e) of FIG. 7A | 1.5 | 0.15 |
| (f) of FIG. 7A | 1.5 | 0.20 |
| (g) of FIG. 7B | 1.5 | 0.30 |
| (h) of FIG. 7B | 1.5 | 0.40 |
| (i) of FIG. 7B | 1.5 | 0.50 |
| (a) of FIG. 7C | 2.0 | −0.050 |
| (b) of FIG. 7C | 2.0 | 0.050 |
| (c) of FIG. 7C | 2.0 | 0.075 |
| (d) of FIG. 7C | 2.0 | 0.10 |
| (e) of FIG. 7C | 2.0 | 0.15 |
| (f) of FIG. 7C | 2.0 | 0.20 |
| (g) of FIG. 7D | 2.0 | 0.30 |
| (h) of FIG. 7D | 2.0 | 0.40 |
| (i) of FIG. 7D | 2.0 | 0.50 |

As can be seen from these drawings, if the diffractive lens of this preferred embodiment was adopted, flares 9 were certainly produced around the focal spot 8 but their intensity was always smaller than the conventional one (see FIG. 17(b)). It can also be seen that the greater the $b/b_0$ ratio, the lower the intensity of the flare 9. For example, in portion (i) of FIG. 7B and in portion (i) of FIG. 7D, the intensity levels of the flares 9 were at most about 1/10000 to about 2/10000 of the peak at the focal spot 8.

Figure 7E:
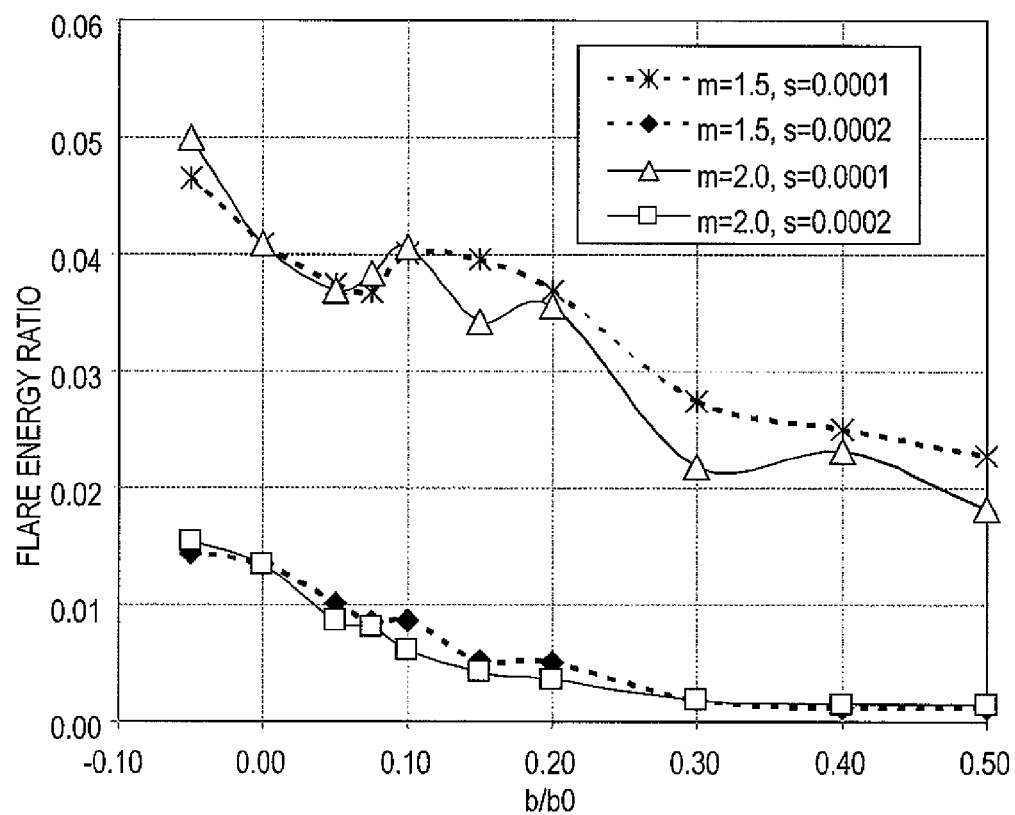
FIG. 7E shows light intensity distributions on the image capturing plane that were obtained through wave calculations with respect to the light that was incident on the diffractive lens of the second preferred embodiment with a wavelength of 0.538 μm and at an angle of incidence of 60 degrees with respect to the optical axis, and also shows how the flare energy ratio, which is obtained by dividing the energy of the flares 9 (which was obtained as an in-plane integrated value of the intensity) by the energy of the focal spot 8, changed with the $b/b_0$ ratio.

FIG. 7E shows how the flare energy ratio, which is obtained by dividing the energy of the flares 9 (which was obtained as an in-plane integrated value of the intensity) included in the results of calculations shown in FIGS. 7A through 7D by the energy of the focal spot 8, changed with the $b/b_0$ ratio. If $b/b_0=0$, Equation (1) agrees with Equation (4). That is to say, if $b/b_0=0$, the results of the diffractive lens of the first preferred embodiment are shown.

Generally speaking, human eyes are insensitive to brightness with a certain intensity or less. For that reason, calculations were made with the flare light intensities, which were at most s times as high as the peak intensity of the focal spot 8, were supposed to be equal to zero. In this case, s used was 0.0001 and 0.0002. FIG. 7E shows relations between the flare energy ratio and the $b/b_0$ ratio with respect to several combinations of m and s. In the example of the conventional diffractive lens shown in FIG. 17, the energy ratios with respect to s=0.0001 and 0.0002 were 0.0668 and 0.0345, respectively.

As shown in FIG. 7E, in any of these curves, the larger the $b/b_0$ ratio, the smaller the flare energy ratio. Particularly if s=0.0002 and if $b/b_0 \geq 0.05$, the flare energy ratio decreased to 30% (0.0345×0.3=0.010) or less of that of the conventional lens. Even if s=0.0001 and if $b/b_0 \geq 0.20$, the flare energy ratio decreased to 55% (0.0668×0.55=0.037) or less of that of the conventional lens. It can also be seen from FIG. 7E that the flare energy ratio does depend heavily on s and $b/b_0$ but depends just lightly on m.

Taking these results into consideration, it can be seen that the b value preferably satisfies the following Inequality (22) and more preferably satisfies the following Inequality (22'):

$$0.05 b_0 < b < b_0 \qquad (22)$$

$$0.2 b_0 < b < b_0 \qquad (22')$$

where b0 satisfies the following Equation (21):

$$b_0 = \frac{1}{mn_0^{m-1}} \qquad (21)$$

Figure 8:
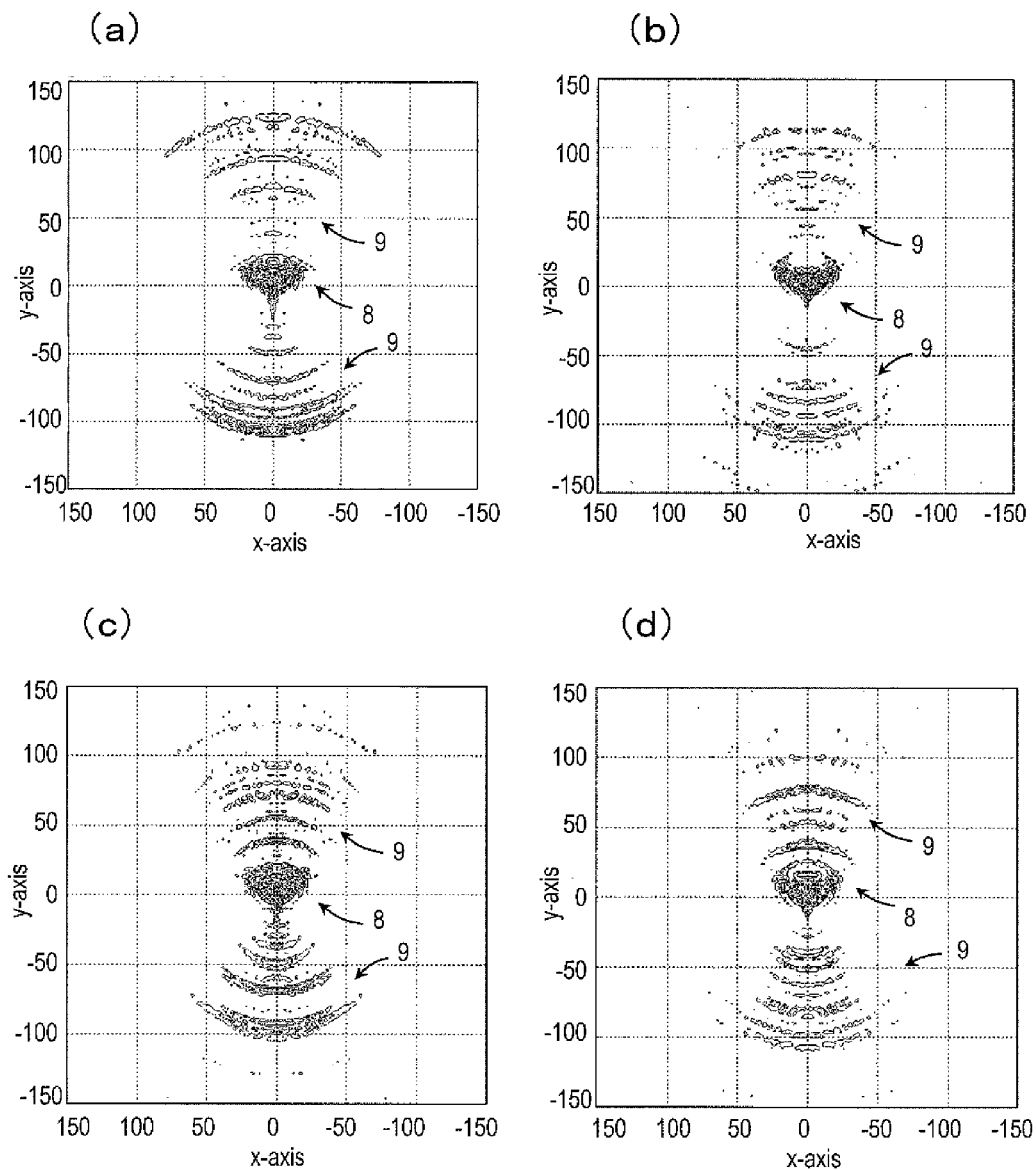
FIG. 8 shows light intensity distributions on the image capturing plane that were obtained through wave calculations as in FIGS. 7A through 7E, wherein (a) shows the results obtained when $-0.25<d_n<0.25$ and $b=0.0$, (b) shows the results obtained when $-0.25<d_n<0.25$, m=2.0 and $b/b_0=0.5$, (c) shows the results obtained when $-0.5<d_n<0.5$, m=2.0 and $b=0.0$, and (d) shows the results obtained when $-0.5<d_n<0.5$, m=2.0 and $b/b_0=0.5$.

FIG. 8 shows a light intensity distribution on the image capturing plane that was obtained through calculations with respect to the light that was incident on the diffractive lens 52 with a wavelength of 0.538 μm and at an angle of incidence of 60 degrees with respect to the optical axis and with $d_n$ falling within a certain range given at random with respect to each n. In FIGS. 8(a) and 8(b), $d_n$ had a value falling within the range of −0.25 to 0.25. On the other hand, in FIGS. 8(c) and 8(d), $d_n$ had a value falling within the range of −0.5 to 0.5. The calculations were made on the supposition that b=0.0 in FIGS. 8(a) and 8(c) and on the supposition that m=2.0 and $b/b_0=0.5$ in FIGS. 8(b) and 8(d). The other conditions are the same as in FIG. 16.

Compared to the situations where $d_n=0.0$ as shown in FIGS. 5, 7C and 7D, in the light intensity distributions shown in FIGS. 8(a) and 8(b), the intensity levels of the flares 9 did not change and the flare areas increased just slightly. On the other hand, the maximum intensity of the flares did not change in FIG. 8(c) but almost doubled in FIG. 8(d). And in FIGS. 8(c) and 8(d), the flare areas increased significantly. In the light intensity distributions shown in FIGS. 8(a) through 8(d), the flare energy ratios with respect to s=0.0001 and 0.0002 were as in the following Table 2:

TABLE 2

| Drawing # | Flare energy ratio with respect to S = 0.0001 | Flare energy ratio with respect to S = 0.0002 |
|---|---|---|
| FIG. 8(a) | 0.0405 | 0.010 |
| FIG. 8(b) | 0.026 | 0.002 |
| FIG. 8(c) | 0.0408 | 0.019 |
| FIG. 8(d) | 0.032 | 0.0083 |

It can be seen from the results shown in this Table that if s=0.0002, the flare energy ratio in the light intensity distribution shown in FIG. 8(c) was approximately twice as high as the one in the light intensity distribution shown in FIG. 8(a). It can also be seen that the flare energy ratio in the light intensity distribution shown in FIG. 8(d) was approximately four times as high as the one in the light intensity distribution shown in FIG. 8(b). These results reveal that it is preferred that $d_n$ fall within the range of −0.25 through 0.25 because the flare energy would increase significantly once this range was exceeded.

As described above, in this diffractive lens 52, the phase steps 2a are arranged so as to satisfy Equation (15) as in the first preferred embodiment described above. Thus, the closer to the outer edge rather than to the optical axis the phase step 2a associated with a shadow region that a light ray 6a passes through, the closer to the diffractive lens 52 the focal point of the light ray 6a gets as shown in FIG. 5. Consequently, the light rays 6a that have passed through the shadow regions never intersect or interfere with each other on the image capturing plane 5 to increase their combined intensity. As a result, the diffraction induced flares can be reduced significantly.

Also, the magnitude of an optical phase shift to be caused by the phase steps also varies according to the angle of incidence of the light. As a result, diffracted light of non-designed orders (i.e., so-called "light of unwanted orders of diffraction") could be produced and could induce flares. However, when it comes to focusing light, those flares will behave in a similar manner to the diffracted light of the light that passes through the shadow regions. Consequently, according to the principle described above, the maximum intensity of the flares to be caused by diffracted light of non-designed orders can be reduced with the same condition adopted.

In the diffractive lens 52, first of all, the positions of the phase steps (i.e., the phase coefficients of the phase function) are determined by Equation (15) as in the first preferred embodiment described above. Next, using, as parameters, the aspheric surface coefficients of a function that determines a basic shape such as an aspheric shape, the parameters are determined so as to achieve the optical properties required. Particularly, according to this preferred embodiment, Equation (15) includes b as an adjustable parameter. That is why the phase coefficient of the phase function can be determined by using b as a parameter and the aspheric surface coefficient can be determined by adjusting the b value within the range of Equation (22). Consequently, a design solution can be easily obtained for the diffractive lens 52 that has the required characteristic.

As described above, according to the first and second preferred embodiments of the present invention described above, the flares can be minimized by arranging phase steps at such positions that satisfy Equation (4) or (15). Also, in that case, a distance between a focal point of light that is transmitted through a surface that defines an $n^{th}$ one of the ring zones as counted from the optical axis and another focal point of light that passes through a shadow region associated with an $n^{th}$ phase step as counted from the optical axis is either constant with respect to n or increases with n. For that reason, the positions of the phase steps may also be determined so as to satisfy such a relation.

Embodiment 3

Figure 9:
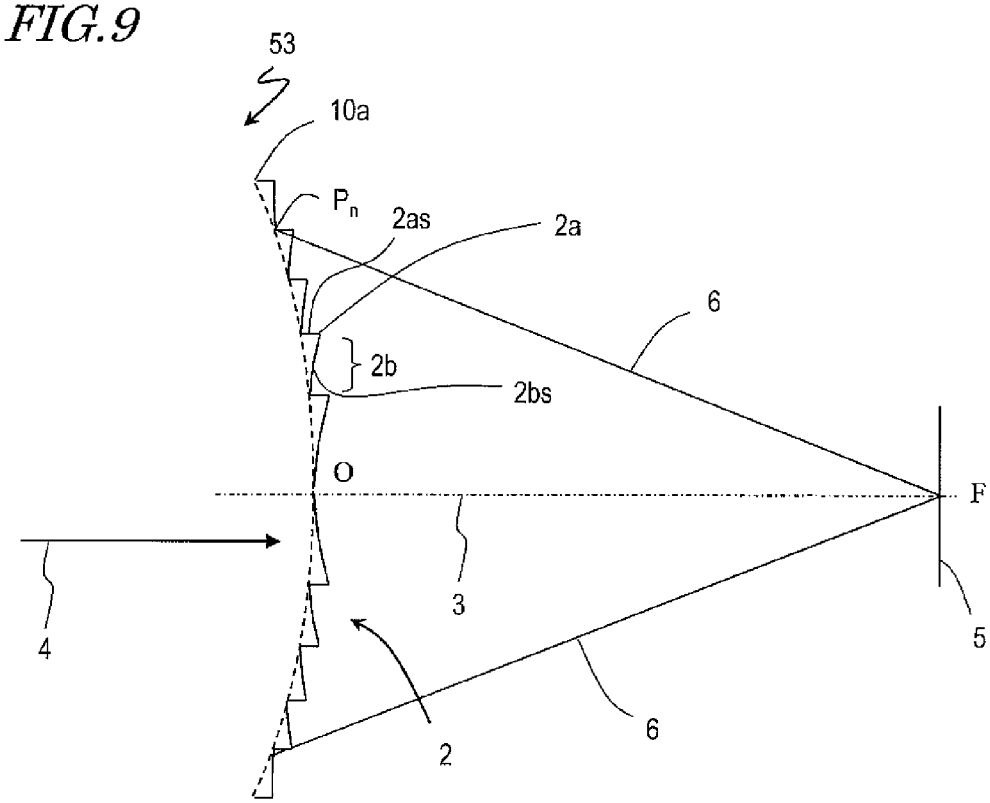
FIG. 9 is a partial cross-sectional view schematically illustrating a third preferred embodiment of a diffractive lens according to the present invention.

Hereinafter, a third preferred embodiment of a diffractive lens according to the present invention will be described with reference to FIG. 9. In the diffractive lens 53 of this third preferred embodiment, the ring zones 2b of its diffraction grating 2' have a different shape from their counterparts of the first and second preferred embodiments described above. Specifically, in the first and second preferred embodiments described above, a cross section of each ring zone 2b as viewed on a plane including the optical axis has an edge that is located closer to the optical axis 3 and a root that is located closer to the outer edge. On the other hand, in the diffractive lens 53 of this preferred embodiment, a cross section of each ring zone 2b as viewed on a plane including the optical axis has a root that is located closer to the optical axis 3 and an edge that is located closer to the outer edge. That is to say, the direction that the saw-toothed shape formed by a cross section of the respective ring zones 2a faces in this preferred embodiment is opposite to the direction in the first and second preferred embodiments. In the other respects, however, the structure of this preferred embodiment is the same as that of the first and second preferred embodiments. In particular, the phase steps 2a are also positioned so as to satisfy Equation (4) or (15) as in the first and second preferred embodiments described above.

The direction that the saw-toothed shape formed by the cross section of the respective ring zones 2a faces is a matter of design to be determined depending on whether the diffraction power should be positive or negative and on the relation in refractive index between the lens body 10 on which the diffraction grating 2' has been formed and its adjacent medium. For example, the diffractive lens 53 is more suitable to a situation where the refractive index of the medium 13 in contact with the diffraction grating 2' is greater than that of the material that makes the lens body 10.

As already described for the first and second preferred embodiments, the phase steps 2a of this diffractive lens 53 are also arranged at such positions that satisfy Equation (4) or (15), and therefore, the flares can also be minimized.

Embodiment 4

Figure 10:
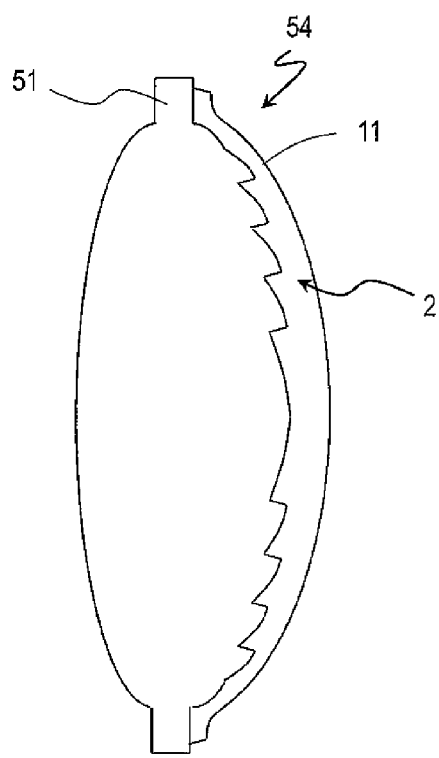
FIG. 10 is a partial cross-sectional view schematically illustrating a fourth preferred embodiment of a diffractive lens according to the present invention.

FIG. 10 is a cross-sectional view illustrating a fourth preferred embodiment of a diffractive lens according to the present invention. The diffractive lens 54 shown in FIG. 10 may include the diffractive lens 51 of the first preferred embodiment and an optical adjustment film 11, which is arranged so as to cover the diffraction grating 2 of the diffractive lens 51. In this case, the optical adjustment film 11 is arranged so as to fill the phase steps of the diffraction grating 2 completely. Optionally, the diffractive lens 51 of the first preferred embodiment adopted in this diffractive lens 54 may be replaced with the diffractive lens 52 of the second preferred embodiment or the diffractive lens 53 of the third preferred embodiment.

The diffractive lens 51 is made of a first material that has a refractive index $n_1(\lambda)$ at its operating wavelength $\lambda$. On the other hand, the optical adjustment film 11 is made of a second material that has a refractive index $n_2(\lambda)$ at its operating wavelength $\lambda$.

If the height of the phase steps of the diffraction grating 2 is d and the diffraction order is q, then the phase steps have a height d represented by the following Equation (23):

$$d = \frac{q \cdot \lambda}{n_1(\lambda) - n_2(\lambda)} \quad (23)$$

It is preferred that the operating wavelength $\lambda$ fall within the visible radiation range and substantially satisfy Equation (23) with respect to any wavelength $\lambda$ falling within the visible radiation range. In this case, to "substantially satisfy" herein means satisfying the relation represented by the following Inequality (24):

$$0.9d \leq \frac{q \cdot \lambda}{n_1(\lambda) - n_2(\lambda)} \leq 1.1d \quad (24)$$

In that case, diffracted light of unwanted orders can be reduced significantly and high diffraction efficiency can be achieved in the entire visible radiation range.

To satisfy either Equation (23) or Inequality (24) in the entire visible radiation range, first and second materials that have refractive indices $n_1(\lambda)$ and $n_2(\lambda)$, respectively, and that have wavelength dependence that makes d substantially constant in the entire visible radiation range may be used in combination. For example, the second material may be a low refractive index, highly dispersive material compared to the first material. In other words, the second material preferably has a smaller refractive index and a smaller Abbe number than the first material.

Naturally, it is possible to use, as the first and second materials, a composite material, of which the refractive index and wavelength dispersion are adjusted by dispersing a resin or inorganic particles in glass. If the refractive index $n_2(\lambda)$ is larger than the refractive index $n_1(\lambda)$, then d becomes a negative value. In that case, the diffractive lens 51 is replaced with the diffractive lens 53.

As described above, in the diffractive lens 54 of this preferred embodiment, the diffraction grating 2 is covered with an optical adjustment film 11, which is a difference from the diffractive lens 54 of the first preferred embodiment described above. However, if the optical adjustment film 11 is an air layer, then it can be said that the diffractive lenses 54 and 51 have the same structure. As can be seen easily by comparing Equations (23) and (2) to each other, the refractive index $n_2(\lambda)$ of the second material, which is an optical material, is usually greater than one. Thus, the height d of the phase steps becomes greater than in the diffractive lens 51 of the first preferred embodiment. Although the light is blocked in a broader area at the phase step portions, the diffraction induced flares can also be reduced as much as in the first preferred embodiment described above. In addition, by satisfying Equation (23), the flares produced by the diffracted light of unwanted orders can be reduced in the entire operating wavelength range.

Embodiment 5

Figure 11:
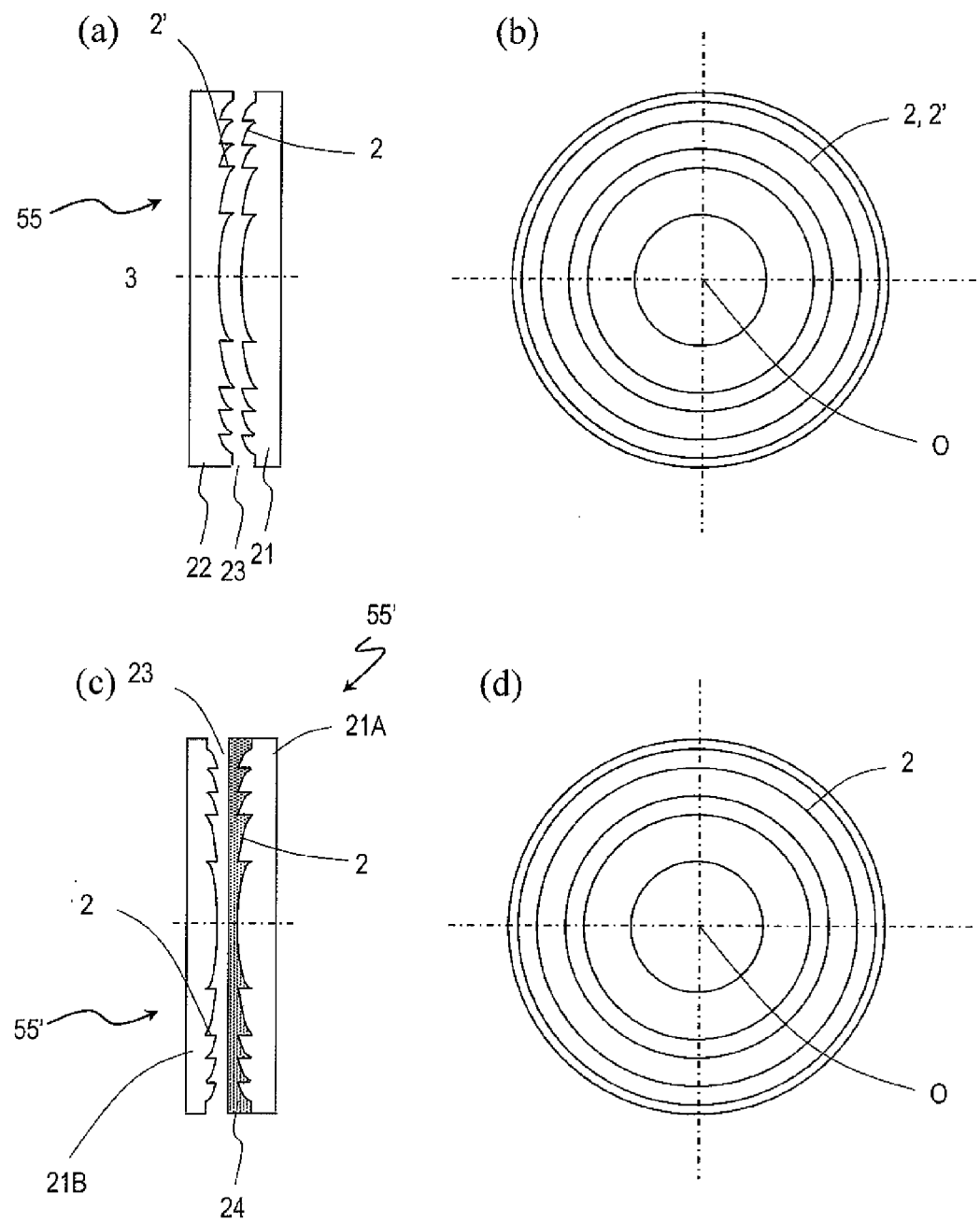
FIGS. 11(a) and 11(b) are respectively a cross-sectional view and a plan view illustrating a stacked optical system as a preferred embodiment of the present invention.
FIGS. 11(c) and 11(d) are respectively a cross-sectional view and a plan view illustrating a stacked optical system as another preferred embodiment of the present invention.

FIG. 11(a) is a schematic cross-sectional view illustrating a preferred embodiment of an optical system according to the present invention and FIG. 11(b) is a plan view thereof. This optical element 55 includes two diffractive lenses 21 and 22. Specifically, the diffractive lens 21 may be the diffractive lens 51 of the first preferred embodiment and may have a diffraction grating 2 that has a structure already described for the first preferred embodiment. On the other hand, the diffractive lens 22 has a diffraction grating 2', of which the shape corresponds to that of the diffraction grating 2. These diffractive lenses 21 and are held so as to leave a predetermined gap 23 between them.

FIG. 11(c) is a cross-sectional view schematically illustrating another preferred embodiment of an optical system according to the present invention and FIG. 11(d) is a plan view thereof. This optical element 55' includes two diffractive lenses 21A and 21B and an optical adjustment film 24. A diffraction grating 2 with the structure that has already been described for the first preferred embodiment has been formed on one side of the diffractive lens 21A. A diffraction grating 2 has also been formed on the diffractive lens 21B. The optical adjustment film 24 covers the diffraction grating 2 of the diffractive lens 21A. The diffractive lenses 21A and 21B are held so as to leave a gap 23 between the diffraction grating 2 on the surface of the diffractive lens 21B and the optical adjustment film 24.

Since these optical elements 55 and 55', in each of which two diffractive lenses are stacked one upon the other, also have a diffraction grating 2, of which the phase steps are arranged at predetermined positions as described for the first preferred embodiment, the diffraction induced flares can also be reduced as already described for the first preferred embodiment.

Embodiment 6

Figure 12:
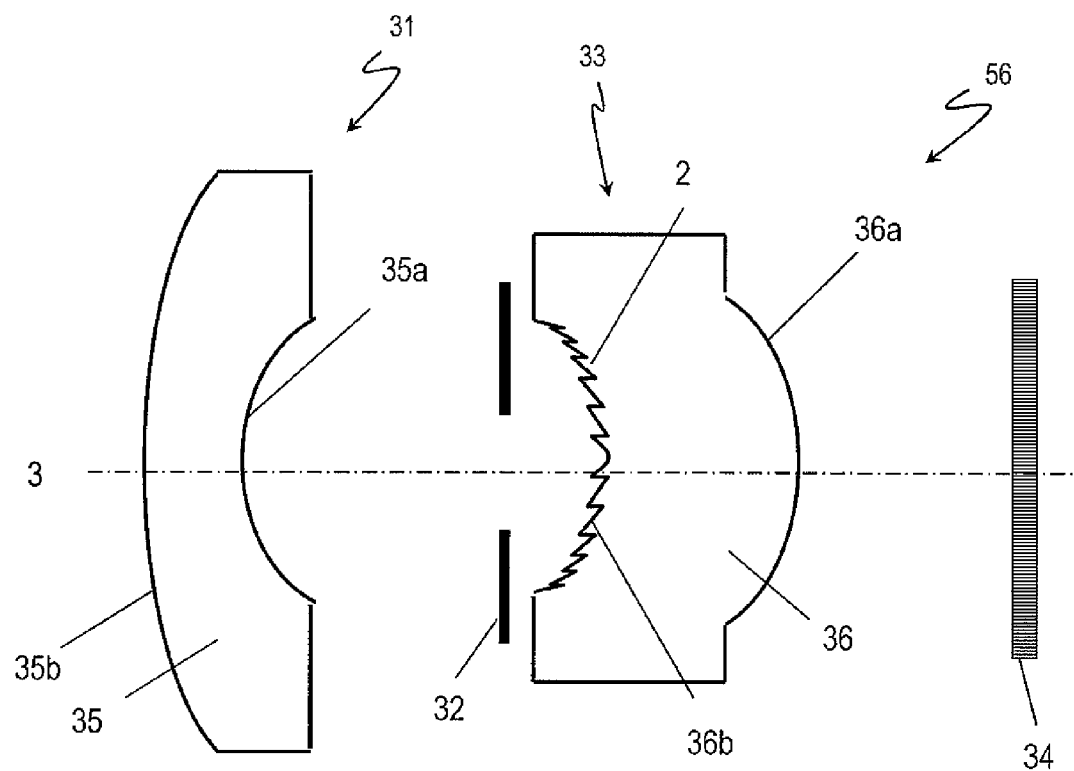
FIG. 12 is a cross-sectional view illustrating a preferred embodiment of an image capture device according to the present invention.

FIG. 12 is a cross-sectional view schematically illustrating a preferred embodiment of an image capture device according to the present invention. This image capture device 56 includes a lens 31, a diffractive lens 33, a diaphragm 32 and an image sensor 34.

The lens 31 has a lens body 35, of which the first and second surfaces 35a and 35b have surface shapes of known lenses such as a spherical shape and an aspheric shape. In this preferred embodiment, the first surface 35a of the lens body 35 has a concave shape and the second surface 35b thereof has a convex shape.

The diffractive lens 33 also has a body 36, of which the first and second surfaces 36a and 36b have a basic shape that may be surface shapes of known lenses such as a spherical shape and an aspheric shape. In this preferred embodiment, the first surface 36a has a convex shape and the second surface 36b thereof has a concave shape. The second surface 36b has the diffraction grating 2 that has already been described for the first preferred embodiment.

The light that has come from the subject through the second surface 35b of the lens 31 is condensed by the lens 31 and the diffractive lens 33, thereby producing an image on the plane of the image sensor 34. And then the image is converted into an electrical signal by the image sensor 34.

The image capture device 56 of this preferred embodiment has two lenses. However, the number or shape of the lenses is not particularly limited. Thus, the image capture device 56 may have only one lens or three or more lenses as well. If the number of lenses to use is increased, the optical performance can be improved. If the image capture device 56 has multiple lenses, the diffraction grating 2 may be provided for any of those lenses. Also, the surface with the diffraction grating 2 may be arranged closer to either the subject or the image sensor. Or diffraction gratings 2 may even be arranged on multiple surfaces, too. Furthermore, the diaphragm 56 may be omitted.

The image capture device of this preferred embodiment has a diffractive lens including the diffraction grating that has already been described for the first preferred embodiment, and therefore, can also shoot an image with diffraction induced flares minimized even under an intense light source.

In the first through sixth preferred embodiments of the present invention described above, in order to describe the flares produced by the diffraction grating, the outgoing light that has left a surface with the diffraction grating is supposed to irradiate the image capturing plane of an image sensor. However, the present invention does not always have to be applied to such a situation where the light needs to be focused on the image capturing plane of an image sensor but is applicable to various other optical systems as well.

INDUSTRIAL APPLICABILITY

The diffractive lens of the present invention and an image capture device that uses such a diffractive lens have the ability to reduce the diffraction induced flares and can be used particularly effectively as a lens and camera of quality.

REFERENCE SIGNS LIST 2, 2' diffraction grating
2a phase step
2b ring zone
4 incoming light
5 image capturing plane
6, 6a light ray
6' shadow region
10 lens body
10a first surface
10b second surface
10e effective area
51, 52, 53 diffractive lens

The invention claimed is:

1. A diffractive lens with the function of focusing light,
wherein the diffractive lens has a side on which a diffraction grating is arranged on either an aspheric surface or a spherical surface in its effective area, and
wherein the diffraction grating has $n_0$ phase steps, which are arranged concentrically around the optical axis of the diffractive lens, and
wherein the radius $r_n$ of the circle formed by every $n^{th}$ one (where n is an integer that falls within the range of 0 through $n_0$) of the phase steps as counted from a side of the optical axis of the diffractive lens satisfies $$r_n = \sqrt{a\{(n+c+d_n) - b(n+c+d_n)^m\}}$$

where a, b, c and m are constants that satisfy $a>0$, $0 \leq c<1$, $m>1$, and $$0.05 b_0 < b < b_0$$
$$b_0 = \frac{1}{m n_0^{m-1}}$$

and $d_n$ is an arbitrary value that satisfies $-0.25 < d_n < 0.25$.

2. The diffractive lens of claim 1, further comprising an optical adjustment film that covers the diffraction grating.

3. An image capture device comprising the diffractive lens of claim 1, and an image sensor.

\* \* \* \* \*